(12) United States Patent
Estee et al.

(10) Patent No.: US 11,924,393 B2
(45) Date of Patent: Mar. 5, 2024

(54) SHARED VIEWING OF VIDEO AMONG MULTIPLE USERS

(71) Applicant: Valeo Comfort and Driving Assistance, Creteil (FR)

(72) Inventors: Nicodemus Estee, San Francisco, CA (US); Jaime Almeida, Fremont, CA (US)

(73) Assignee: VALEO COMFORT AND DRIVING ASSISTANCE (FR)

( * ) Notice: Subject to any disclaimer, the term of this patent is extended or adjusted under 35 U.S.C. 154(b) by 0 days.

(21) Appl. No.: 17/156,307

(22) Filed: Jan. 22, 2021

(65) Prior Publication Data
US 2022/0239887 A1    Jul. 28, 2022

(51) Int. Cl.
*H04N 13/167*    (2018.01)
*G06T 19/00*    (2011.01)
(Continued)

(52) U.S. Cl.
CPC ......... *H04N 13/167* (2018.05); *G06T 19/006* (2013.01); *H04N 7/15* (2013.01);
(Continued)

(58) Field of Classification Search
None
See application file for complete search history.

(56) References Cited

U.S. PATENT DOCUMENTS 8,893,010 B1 * 11/2014 Brin .................... H04L 65/4076
    715/738
9,324,173 B2    4/2016 Castelli et al.
(Continued)

FOREIGN PATENT DOCUMENTS

WO    WO 2018057980 A1    3/2018
WO    WO 2018230563 A1    12/2018

OTHER PUBLICATIONS

Lee et al., "A user study on mr remote collaboration using live 360 video," 2018 IEEE International Symposium on Mixed and Augmented Reality (ISMAR) (Year: 2018).*
(Continued)

*Primary Examiner* — Anh-Tuan V Nguyen
(74) *Attorney, Agent, or Firm* — Weaver Austin Villeneuve & Sampson LLP

(57) ABSTRACT

Described are techniques for shared viewing of video among remote users, including methods and corresponding systems and apparatuses. A first computer device operated by a first user can receive an input video stream representing a three-dimensional (3D) space. From the input video stream, an output video stream corresponding to the 3D space as seen from a viewing direction specified by the first user is generated. The output video stream includes images that cover a narrower field of view compared to the input video stream. The first computer device can receive information indicating a viewing direction specified by a second user, who is a user of a second computer device. The first computer device can update the output video stream based on the information indicating the viewing direction specified by the second user. The updated output video stream can then be presented on a display of the first user.

18 Claims, 14 Drawing Sheets

(51) Int. Cl.
    *H04N 7/15*           (2006.01)
    *H04N 13/183*       (2018.01)
    *H04N 13/194*       (2018.01)
    *H04N 13/282*       (2018.01)
    *H04N 21/4402*      (2011.01)
    *H04N 21/81*        (2011.01)
    *H04N 23/698*       (2023.01)

(52) U.S. Cl.
    CPC ......... *H04N 13/183* (2018.05); *H04N 13/194* (2018.05); *H04N 13/282* (2018.05); *H04N 21/4402* (2013.01); *H04N 21/816* (2013.01); *H04N 23/698* (2023.01)

(56) References Cited

U.S. PATENT DOCUMENTS

| | | | |
|---|---|---|---|
| 9,392,212 B1 | 7/2016 | Ross | |
| 9,530,426 B1 | 12/2016 | Wright et al. | |
| 9,654,831 B2 | 5/2017 | Stern | |
| 9,762,851 B1* | 9/2017 | Baumert | G06T 19/006 |
| 9,883,138 B2 | 1/2018 | Chen et al. | |
| 10,277,813 B1* | 4/2019 | Thomas | H04N 23/90 |
| 10,284,753 B1* | 5/2019 | Naik | G06T 7/596 |
| 10,627,622 B2 | 4/2020 | Kuene | |
| 2005/0116964 A1* | 6/2005 | Kotake | G06T 15/205 |
| | | | 345/632 |
| 2010/0131947 A1 | 5/2010 | Ackley et al. | |
| 2013/0076853 A1* | 3/2013 | Diao | H04N 7/157 |
| | | | 348/E7.083 |
| 2013/0257899 A1 | 10/2013 | Baron | |
| 2013/0293468 A1* | 11/2013 | Perez | G06F 3/033 |
| | | | 345/158 |
| 2014/0032679 A1* | 1/2014 | Tandon | H04L 12/1827 |
| | | | 709/205 |
| 2014/0036027 A1* | 2/2014 | Liu | H04N 7/157 |
| | | | 348/14.07 |
| 2014/0177841 A1 | 6/2014 | Hazzani et al. | |
| 2014/0245192 A1 | 8/2014 | Chavez | |
| 2014/0304750 A1 | 10/2014 | Lemmey et al. | |
| 2014/0328148 A1 | 11/2014 | Yang et al. | |
| 2015/0005630 A1* | 1/2015 | Jung | A61B 8/468 |
| | | | 600/437 |
| 2015/0211880 A1* | 7/2015 | Arita | G01C 21/3667 |
| | | | 701/409 |
| 2016/0150212 A1* | 5/2016 | Moura | H04N 13/167 |
| | | | 375/240.02 |
| 2016/0341959 A1* | 11/2016 | Gibbs | G06V 20/20 |
| 2017/0011557 A1* | 1/2017 | Lee | G06F 3/04842 |
| 2017/0075373 A1 | 3/2017 | Park et al. | |
| 2017/0293809 A1 | 10/2017 | Thompson et al. | |
| 2017/0313248 A1 | 11/2017 | Kothari | |
| 2017/0339341 A1* | 11/2017 | Zhou | H04N 5/23238 |
| 2017/0339372 A1 | 11/2017 | Valli | |
| 2018/0089900 A1 | 3/2018 | Rober et al. | |
| 2018/0089901 A1 | 3/2018 | Rober et al. | |
| 2018/0091923 A1 | 3/2018 | Satongar et al. | |
| 2018/0152663 A1* | 5/2018 | Wozniak | G06T 7/13 |
| 2018/0176502 A1* | 6/2018 | Bhuruth | G06V 20/42 |
| 2018/0189958 A1* | 7/2018 | Budagavi | H04N 21/84 |
| 2018/0232937 A1 | 8/2018 | Moyer et al. | |
| 2018/0259958 A1 | 9/2018 | Kalanick et al. | |
| 2018/0270464 A1* | 9/2018 | Harviainen | H04N 13/344 |
| 2018/0295389 A1* | 10/2018 | Kakurai | H04N 21/8146 |
| 2018/0311585 A1* | 11/2018 | Osman | A63F 13/5255 |
| 2018/0350143 A1 | 12/2018 | Kühne | |
| 2018/0357036 A1* | 12/2018 | Tomita | H04N 7/147 |
| 2018/0369702 A1 | 12/2018 | Hake | |
| 2019/0019329 A1 | 1/2019 | Eyler et al. | |
| 2019/0149731 A1* | 5/2019 | Blazer | G06F 3/011 |
| | | | 348/39 |
| 2019/0204604 A1 | 7/2019 | Wu | |
| 2019/0253693 A1* | 8/2019 | Ha | H04L 65/601 |
| 2019/0258880 A1 | 8/2019 | Brauer | |
| 2019/0302761 A1 | 10/2019 | Huang et al. | |
| 2019/0331914 A1* | 10/2019 | Lee | G06F 3/013 |
| 2019/0355178 A1* | 11/2019 | Hermina Martinez | H04W 4/40 |
| 2020/0066055 A1 | 2/2020 | Hermina Martinez et al. | |
| 2021/0092371 A1* | 3/2021 | Han | H04N 19/119 |
| 2021/0120066 A1* | 4/2021 | Oyman | H04L 67/14 |
| 2021/0255756 A1* | 8/2021 | Field | G06F 3/017 |
| 2021/0392293 A1* | 12/2021 | Abhishek | H04N 7/147 |
| 2022/0070241 A1* | 3/2022 | Yerli | H04L 65/4053 |
| 2022/0239719 A1* | 7/2022 | Gül | H04N 21/2187 |

OTHER PUBLICATIONS

Ochi et al., "Live streaming system for omnidirectional video," 2015 IEEE Virtual Reality (VR) (Year: 2015).*

Orts-Escolano, S., et al., "Holoportation: Virtual 3D Teleportation in Real-time", 29th ACM User Interface Software and Technology Symposium, Oct. 16-19, 2016, 14 pages.

Gaspar, John et al., "Providing Views of the Driving Scene to Drivers' Conversation Partners Mitigates Cell-Phone-Related Distraction", Psychological Science 2014, vol. 25 (12), pp. 2136-2146 (Year: 2014).

International Search Report and Written Opinion—PCT/EP/2019/061501—ISA/EPO—dated Jul. 20, 2019—13 pages.

U.S. Non-Final Office Action dated Mar. 15, 2019, in U.S. Appl. No. 15/984,065.

Notice of Allowance dated Aug. 16, 2019, in U.S. Appl. No. 15/984,065.

U.S. Non-Final Office Action dated May 6, 2019, in U.S. Appl. No. 15/984,065.

U.S. Final Office Action dated Oct. 7, 2020, in U.S. Appl. No. 15/984,065.

U.S. Advisory Action dated Dec. 19, 2020, in U.S. Appl. No. 15/984,065.

Notice of Allowance dated May 3, 2021, in U.S. Appl. No. 15/984,065.

U.S. Non-Final Office Action dated Dec. 4, 2020, in U.S. Appl. No. 16/667,644.

International Preliminary Report on Patentability—PCT/EP/2019/061501—ISA/EPO—dated Nov. 24, 2020—7 pages.

* cited by examiner

800

```
Determine that a point of view (POV) of a second user should be
used to generate an output video stream for a first user, based on:

(1) first user choosing to follow POV of second user, or (2) second user choosing to share their POV with other users
802
```

↓

```
Apply a quarternion generated by the device of the second user to
generate an updated output video stream, thereby replacing the
local user's POV with the POV of the second user
804
```

↓

```
Updated output video stream is displayed
806
```

FIG. 8

SHARED VIEWING OF VIDEO AMONG MULTIPLE USERS

BACKGROUND

Aspects of the present disclosure relate to facilitating communication of video between two or more users. Certain aspects are directed to concurrent viewing of a 360° video stream by different users, with the viewing direction or point-of-view for an individual user being controllable by the individual user. Further, aspects of the present disclosure relate to electronic communication of information indicating the point-of-view of different users.

It is sometimes difficult for users to meet in person, for example, in order to view a physical environment such as the inside of a building or, in general, any three-dimensional space. For instance, some users may be located far from the environment or unable to travel to the environment due to scheduling conflicts or other restrictions. In such situations, videoconferencing technology can be used to capture and present video of the environment to a remote user. However, if there are multiple users viewing the video, it can be difficult to coordinate viewing among the users because different users may be looking at or have their attention focused on different regions of the environment. Coordinated viewing is even more difficult when a user is provided with the ability to control the point-of-view from which the video is presented to the user. Consequently, there may be times when a first user is unable to see what a second user is looking at because the first user and the second user have different points-of-view.

BRIEF SUMMARY

Example embodiments of the present disclosure relate to facilitating communication of video between two or more users to enable the users to view a video stream in a coordinated manner. Embodiments are described in connection with 360° video, that is, video featuring 360° images. However, the embodiments described herein are applicable to any video stream that can be viewed from different perspectives by different users. Accordingly, the embodiments are not limited to 360° video.

In some aspects, shared viewing involves communication of information indicating the point-of-view (POV) associated with a computer device of a user to computer devices of other users. This information can be used to, among other things, inform users about what other users are viewing. In particular, embodiments are described in which each user can control the POV for their own computer device (referred to herein as a "user device") by specifying a viewing direction corresponding to the direction of a virtual camera that determines which portion of an input video stream is presented to the user at any given time.

In some aspects, POV information relating to a first user (e.g., information indicating a viewing direction specified by the first user) is usable for updating an output video stream presented to a second user. For instance, the second user may be provided with the ability to switch to the POV of the first user and vice versa. Additionally, in some instances, an output video stream presented to a user may be augmented with graphical elements such as highlighting, text labels, and the like. Such augmentation can serve to, for example, indicate that a region of a three-dimensional (3D) space is currently being viewed by another user or has been selected by the other user as being a region of interest.

In one embodiment, a method is provided for shared viewing of video among remote users. The method can be implemented using a first user device operated by a first user. In some implementations, the first user device may correspond to an apparatus including one or more processors, a display viewable by the first user, and a memory storing instructions that, when executed by the one or more processors, cause the one or more processors to perform the method. The method involves receiving an input video stream representing a 3D space, where the input video stream comprises images that each cover a first field of view. The method further involves generating, using the input video stream, an output video stream corresponding to the 3D space as seen from a viewing direction specified by the first user. The output video stream comprises images that each cover a second field of view which is narrower than the first field of view. The method further involves receiving information indicating a viewing direction specified by a second user. The second user is a user of a second computer device remote from the first computer device. The viewing direction specified by the second user corresponds to a rotation of the viewing direction specified by the first user. The method further involves updating the output video stream based on the information indicating the viewing direction specified by the second user, and then causing the updated output video stream to be presented on a display of the first user.

BRIEF DESCRIPTION OF THE DRAWINGS

Aspects of the disclosure are illustrated by way of example. In the accompanying figures, like reference numbers indicate similar elements.

FIG. 8 is a flow diagram illustrating a method for updating an output video stream to correspond to a viewing direction associated with another user device, according to an embodiment.

DETAILED DESCRIPTION OF THE INVENTION

Figure 1:
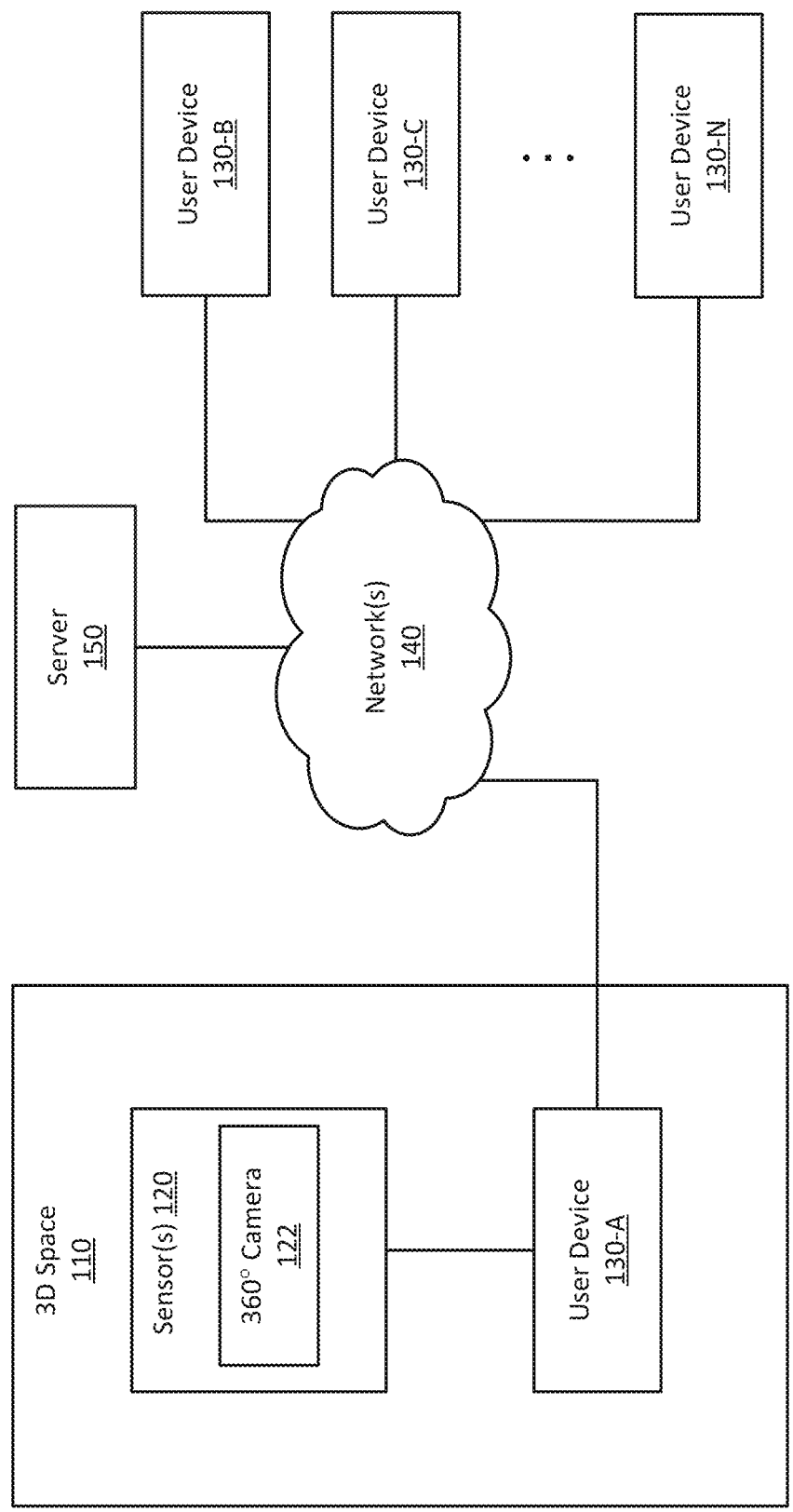
FIG. 1 is a simplified block diagram of a system according to an embodiment.

The present disclosure relates to systems, apparatuses and corresponding methods for enabling two or more users to view a video stream in a coordinated manner. Videoconferencing often involves using a camera to capture real-time video of a first user in order to present the captured video to a second user together with captured audio of the first user. Similarly, audio and video of the second user can be captured and presented to the first user. Accordingly, both users may be able to see and hear each other even though the users may be remotely located from one another.

In some instances, videoconferencing is used to allow a remote user to view a physical environment without being present in the environment. For example, videoconferencing technology has been used to host virtual open houses in which video of real estate is streamed to a remote user, e.g., for output on a display of a home computer or a mobile device. The remote user may be able to control the viewing direction, for example, to see a different side of a room inside a house. Although the ability to see an environment from different perspectives is beneficial, this capability can make shared viewing among multiple users challenging. For example, a first user may be viewing something that is outside the viewing area of a second user, e.g., a region of the environment being presented on the first user's display is offscreen from the display of the second user. If the users are able to communicate with each other, e.g., verbally or by text message, the first user can instruct the second user where to look, so that the second user can manually adjust their viewing direction to correspond to that of the first user. However, the information communicated tends to be imprecise, for example, "look at object X, which is to the left of object Y." Further, in some cases, the second user may be unable to follow the first user's instruction for lack of a shared reference point. For example, "object Y" may also be offscreen for the second user.

In order to address the above-described challenges and other challenges associated with shared viewing of video, embodiments are disclosed herein which feature communication of information indicating the point-of-view (POV) associated with a computer device of a user to computer devices of other users. In some embodiments, every user device participating in a video sharing session receives information regarding the POVs associated with all other user devices. As discussed below, the POV associated with a user device can correspond to a viewing direction specified by the user of the user device, and there may be multiple ways of specifying viewing direction.

In some aspects, POV information relating to a first user (e.g., information indicating a viewing direction specified by the first user) is usable for updating an output video stream presented to a second user. For instance, the second user may be provided with the ability to switch to the POV of the first user and vice versa. In some implementations, one or more users may be provided with the ability to set the POV of another user. For example, in some embodiments, a host or other user in control of a videoconference can use their device to specify the POV of other users, e.g., by setting the POV for every other user to be the same as the POV associated with the host's device. Additionally, in some instances, an output video stream presented to a user may be augmented with graphical elements such as highlighting, text labels, and the like. Such augmentation can serve to, for example, indicate that a region of a three-dimensional (3D) space is currently being viewed by another user or has been selected by the other user as being a region of interest.

FIG. 1 is a simplified block diagram of a system 100 according to an embodiment. The system 100 includes a physical environment captured as part of a video stream for output to multiple users remotely located from each other. In the example of FIG. 1, the physical environment is a 3D space 110 in which one or more sensors 120 are located. Embodiments of the present disclosure can be used for a variety of applications such as quality inspection (e.g., touring a factory floor), security (e.g., monitoring a building's premises), remote tourism (e.g., a virtual field trip), and the like. Other potential applications for the disclosed embodiments include, but are not limited to, automotive (e.g., viewing the cabin of a car and/or the environment outside the car), real estate (e.g., virtual tours of houses, commercial property, or indoor/outdoor lots), remote product demonstration, virtual commerce (e.g., showing products inside a physical retail store), virtual spectatorship (e.g., immersive viewing of sports events or music concerts), virtual classrooms, and remote conferences. Accordingly, the space 110 can represent any one of numerous types of physical environments, including indoor environments as well as outdoor environments.

As shown in FIG. 1, the sensor(s) 120 can include a 360° camera 122. A 360° camera (also known as an omnidirectional camera) is any camera with a field of view that spans a full 360 degrees. An image captured by a 360° camera can correspond to a complete sphere or at least a circle around a horizontal plane. A 360° camera can include multiple lenses (e.g., a front lens and a back lens) and, in some cases, is formed using multiple camera devices or image sensors. For example, a 360° image can be generated by stitching together images captured by cameras that individually have less than a 360° field of view. Accordingly, the camera 122 can be a single device or multiple devices. Further, in some embodiments, camera 122 may be configured with a field of view that is less than 360°, for example, between 180° and 360°.

Camera 122 can be stationary, e.g., mounted on a stand. In some instances, camera 122 may be moved around the space 110 during operation. For example, the camera 122 can be mounted on a handheld tripod, and an operator of the camera 122 may carry the camera 122 while walking around the space 110. In some instances, the camera 122 may be attached to a gimbal so that the direction in which the camera 122 faces remains substantially fixed even if the camera is moved around.

Sensor(s) 120 can include other sensors besides camera 122. For example, the sensors 120 can include a non-360° camera. Other examples of sensors 120 include a microphone, other types of image sensors (e.g., an infrared camera), a radar sensor, a Light Detection and Ranging (LIDAR) sensor, an ultrasonic sensor, a gyroscope, a motion sensor, etc. The sensors 120 can be co-located (e.g., in the same device) or in different locations within the space 110. In some embodiments, the sensors 120 may include a user-facing camera integrated into a user device 130-A. As shown in FIG. 1, the user device 130-A is in the space 110 together with the camera 122. Thus, the user operating the user device 130-A can also be the operator of the camera 122.

User device 130-A is configured to receive sensor data from the sensor(s) 120, including at least a video stream from the camera 122. For instance, a video stream from the camera 122 can include digital images (e.g., red-green-blue (RGB) formatted images) that are encoded for transmission as an MPEG (Moving Picture Experts Group) video. Camera 122 may be configured to generate the video stream continuously and to transmit the video stream to the user device 130-A in real time using a wireless communications channel. For example, the camera 122 may send the video stream to the user device 130-A using a Bluetooth connection. In some implementations, at least some of the sensor data generated by the sensor(s) 120 is transmitted to the user device 130-A through wired communications (e.g., using a Universal Serial Bus (USB) interface).

In the embodiment of FIG. 1, the user device 130-A is configured to collect the sensor data from the sensor(s) 120 and to forward the sensor data to a server 150 for processing and distribution to other user devices 130 (e.g., user devices 130-B, 130C, and 130-N). In particular, the server 150 may provide each of the other user devices with a copy of the video stream that was forwarded by the user device 130-A. As shown in FIG. 1, communication between the user devices 130 and the server 150 may be through one or more networks 140. The network(s) 140 can include, for example, the Internet, a cellular network (e.g., a 4G or 5G network), a wide area network (WAN), a local area network (LAN), or a combination thereof. Further, in some embodiments, the camera 122 may be configured to send video to the server 150 without the user device 130-A acting as an intermediary. For instance, the camera 122 can be implemented as a purpose-built computing device that includes a network interface card for communicating with the server 150 wirelessly or using a wire.

The users of the system 100 are the operators of the user devices 130. As mentioned above, the operator of the user device 130-A can also be the operator of the camera 122. In some instances, the operator of the user device 130-A is a meeting host responsible for setting up a videoconference for purposes of showing the space 110 to the other users. However, as indicated above, the camera 122 does not necessarily have to send video via the user device 130-A. Therefore, the user device 130-A could, like the other user devices 130-B, 130C, and 130-N, be located remotely from the space 110. In such instances, the camera 122 may be operated by someone who does not receive video from the server 150. Alternatively, in some instances, the camera 122 may be left to run unmanned, at least for the duration of a videoconference between the user devices 130.

The user devices 130 can be of the same type or include a mix of different types of computer devices, such portable devices (mobile phones, tablets, laptops, etc.), non-portable devices (desktop computers, smart televisions, workstations, etc.), or a combination of portable and non-portable devices. In some embodiments, each user device 130 is configured to connect to the server 150 using a software application that is executed locally at the user device. For instance, the software application may be a videoconferencing application that permits a first user device (e.g., user device 130-A) to act as a host device and that also permits other user devices (e.g., user devices 130-B, 130-C, and 130-N) to act as guest devices.

Each user device 130 may include or be coupled to a display configured to present an output video stream generated using the video stream from the camera 122. The video stream from the camera 122 is an input video stream that can be processed (e.g., locally within each user device) to produce an output video stream for a particular user. The output video stream can be generated according to a viewing direction specified by the user. A user device can permit a user to control their own viewing direction, and therefore what portion of the space 110 that is captured by the camera 122 will be included in the output video stream. For example, while the camera 122 may have a 360° field of view, the output video stream that is displayed to a user may comprise images that have a narrower field of view (e.g., 100°).

In addition to causing an output video stream representing the space 110 to be presented to a user, each user device 130 may permit its user to participate in the videoconference using audio and/or video of the user. For example, each user device 130 may include a user-facing camera and/or a microphone configured to capture the voice of its user. Accordingly, users may be able to see and hear each other in addition to seeing (and possibly hearing) the space 110. As with the video from the camera 122, the server 150 may be configured to distribute video or audio of users to the user devices 130.

Server 150 can be implemented as a single computer or a network of computers. In some embodiments, server 150 may be a cloud-based server. The server 150 can be configured to transmit (e.g., broadcast) the video captured by the camera 122 to each user device 130 except the user device 130-A, since the user device 130-A supplies the video to the server 150 in the embodiment of FIG. 1. Additionally, the server 150 may be configured to provide each user device 130 with information indicating a viewing direction specified by a user of another user device 130. For example, server 150 may be configured to periodically receive, from each user device 130, information on the current viewing direction associated with the user device and to broadcast this information to every other user device 130. Examples of ways in which information about viewing direction can be used to update an output video stream are described below.

Figure 2:
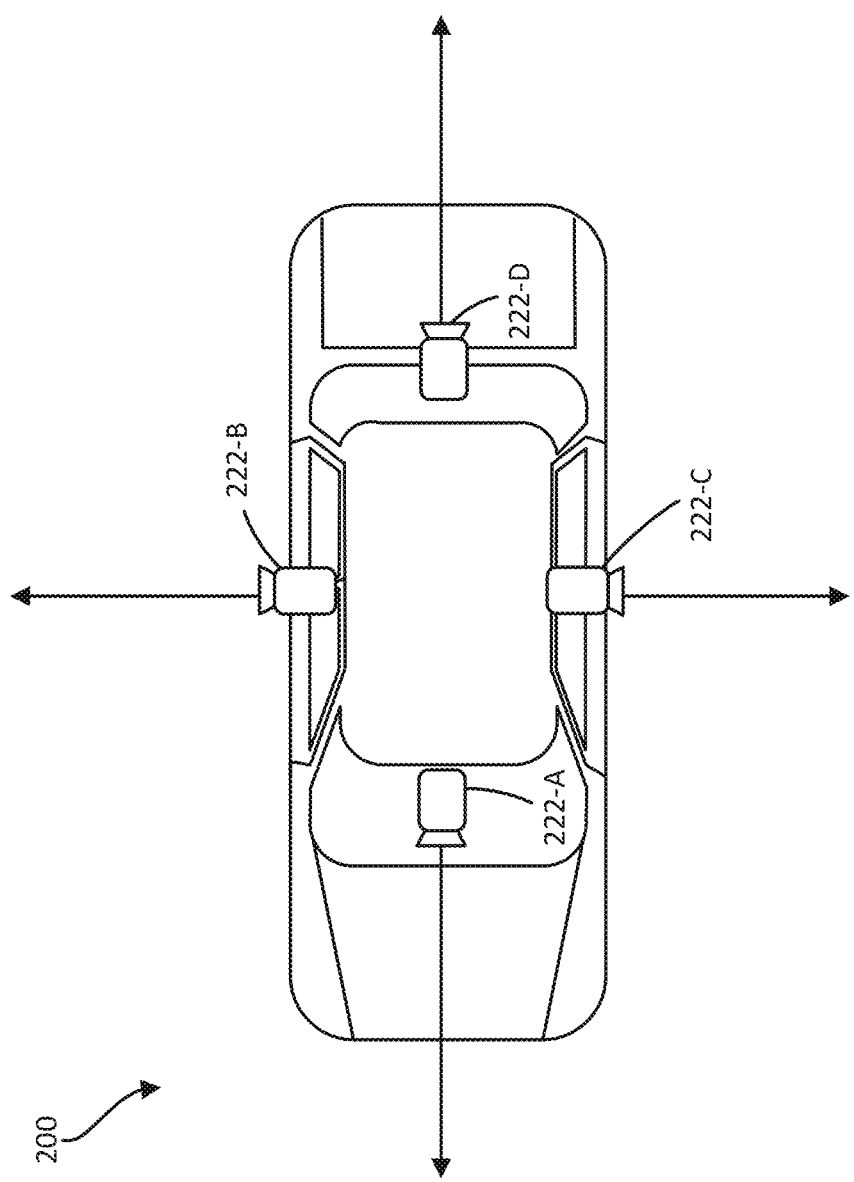
FIG. 2 illustrates an example of a vehicular environment in which an input video stream can be generated.

FIG. 2 illustrates an example of a vehicular environment that can correspond to the space 110 in FIG. 1. In FIG. 2, a vehicle 200 is equipped with multiple outward facing cameras 222-A to 222-D. Each of the cameras 222 is configured to capture images of the environment along a different direction. For instance, as depicted in FIG. 2, camera 222-A may be pointing outward from a front of the vehicle 200, camera 222-B may be pointing outward from a first passenger side, camera 222-C may be pointing outward from a second passenger side, and camera 222-D may be pointing outward from a rear of the vehicle 200. Images captured by the cameras 222A to 222D can be stitched together to form an image analogous to that captured by the camera 122 in FIG. 1, for example, an image corresponding to a field of a view that is greater than 180°, possibly up to 360°. Thus, separate cameras can be used to form a video stream for distribution to user devices. The video stream can be formed locally by a processor of the vehicle 200. Alternatively, in some implementations, the vehicle 200 may be configured to send a separate video stream generated by each camera 222 to a server (e.g., the server 150), and the server may combine the separate video streams into a single video stream for distribution to user devices. FIG. 2 is merely an example of how a video stream can be captured in connection with a 3D space associated with a vehicle. Other configurations are possible including, for example, substituting a single 360° camera (e.g., mounted on a roof of the vehicle) in place of multiple cameras 222.

In the example of FIG. 2, the cameras 222 are outward facing and therefore configured to capture views of the environment outside the vehicle 200. Such a configuration may be useful for showing the environment while the vehicle 200 is in operation. For instance, the configuration shown in FIG. 2 can be used for remote or autonomous operation of the vehicle 200 to enable a human or machine agent to control the vehicle 200 based on video showing what is happening outside the vehicle 200. As an alternative or in addition to outward facing cameras, some embodiments may feature one or more interior facing cameras and/or other types of sensors configured to generate sensor data relating to occupants of the vehicle 200. For instance, an interior facing camera in combination with an in-cabin microphone can enable a vehicle occupant to engage in videoconferencing with one or more remote users.

Figure 3:
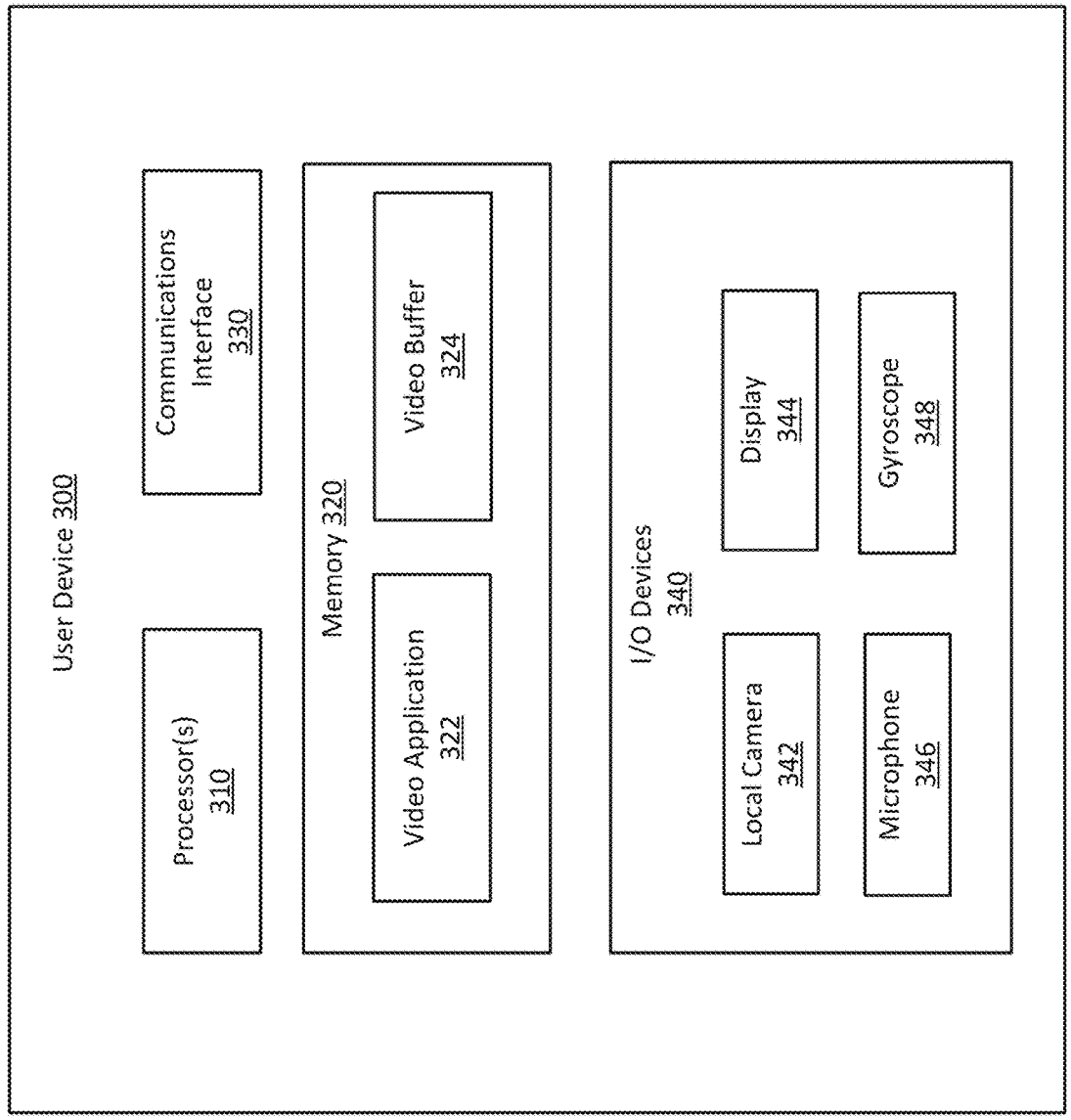
FIG. 3 is a simplified block diagram of a user device usable for implementing one or more embodiments.

FIG. 3 is a simplified block diagram of a user device 300 usable for implementing one or more embodiments. For instance, the user device 300 can correspond to any of the user devices 130 in FIG. 1. User device 300 includes one or more processors 310, a memory 320, a communications interface 330, and input/output (I/O) devices 340. As discussed above, a user device can be configured to execute a software application for connecting to a server in connection with the sharing of video among multiple user devices. Accordingly, as shown in FIG. 3, the memory 320 may include a video application 322 that is executable by the processor(s) 310. The video application 322 may include instructions that, when executed by the processor(s) 310, cause the user device 300 to connect to a remote server (e.g., server 150) for the purpose of providing the server with video for distribution to other user devices 300 and/or for receiving video from the server.

Processor(s) 310 can include one or more general purpose processors and/or special purpose processors. For instance, processors 310 can include a central processing unit (CPU) in combination with a graphics processing unit (GPU). Each processor 310 can include one or more processing cores that collectively form a multi-core processor. The processors(s) 310 may be configured to perform image processing operations on video. For example, a GPU may apply image processing techniques to a video stream received from a server to generate an output video stream for display on a display 344. An example of how an output video stream can be generated is discussed below in connection with FIGS. 4A and 4B.

Memory 320 may include a video buffer 324 for temporarily storing an input video stream and/or an output video stream. For example, the video buffer 324 can be configured to store an input video stream until the processor(s) 310 are ready to process the input video stream. Similarly, the video buffer 324 can be configured to delay (e.g., under the control of the video application 322) the transmission of an output video stream to the display 344 so that the output video stream is presented on the display 344 in synchronization with presentation of corresponding output video streams at other user devices 300. Memory 320 can be implemented using one or more types of memory (static random-access memory (SRAM), dynamic random-access memory (DRAM), read-only memory (ROM), etc.) and can include working memory for the processor(s) 310.

Communications interface 330 is configured to engage in wireless and/or wired communication with a remote device such as the server 150, another user device 300, or a peripheral device such as an I/O device 340. Communications interface 330 can be implemented in hardware and/or software and may, for example, include a network interface card or network controller configured to send data (e.g., a video stream) over the Internet using Transmission Control Protocol (TCP) and/or Internet Protocol (IP) packets. Communications interface 330 can be configured for wireless communications, for example, to establish a Bluetooth connection to the camera 122 in FIG. 1 or to access a WiFi network via a wireless router or access point. Thus, the communications interface 330 can include one or more antennas for transmitting a wireless signal and one or more antennas for receiving a wireless signal. Communications interface 330 can be configured for multiple communication modes. For example, the communications interface 330 may be capable of communicating with the server 150 through a WiFi network, a LAN, and a cellular network, and may be configured to use the cellular network as a default option when no WiFi network or LAN is available.

I/O device(s) 340 can include a local camera 342, a display 344, a microphone 346, a gyroscope 348, and/or other devices configured to permit the user device 300 to interact with a user and/or the environment around the user device 300. For example, in an automotive setting, the I/O devices 340 may include a radar sensor, a LIDAR sensor, an ultrasonic sensor, etc.

Local camera 342 can be used to capture images and/or video of a user. For instance, the camera 342 may be configured to capture video of a user operating the user device 300 for presentation to users of other user devices 300 as part of a video conference. In some embodiments, local camera 342 may be used to generate additional views of a 3D space such as the space 110, for example, to supplement the video generated by the 360° camera 122.

Display 344 is configured to present an output video stream to a user of the user device 300. In some embodiments, the display 344 may be integral to the user device 300. For example, display 344 can be a touchscreen on a mobile phone or tablet. In other embodiments, the display 344 may be a peripheral device such as a monitor connected to the user device 300 via a cable. As another example, the display 344 could be a virtual reality headset.

Microphone 346 can be used to capture the voice of a user and/or sound in the environment around the user device 300. For example, in a factory setting, it may be important for remote users to be able to hear the sound of machinery in addition to seeing the machinery. Accordingly, microphone 346 can be used as an additional source of sensor data relating to a space being viewed by remote users.

Gyroscope 348 is configured to generate information indicating the orientation of the user device 300. For instance, gyroscope 348 may be a three-axis gyroscope configured to measure rotation about three axes that are orthogonal to each other. The orientation of the user device 300 can be used as an input to the video application 322. For example, the video application 322 may be configured to set a viewing direction based on the device orientation.

Figure 4B:
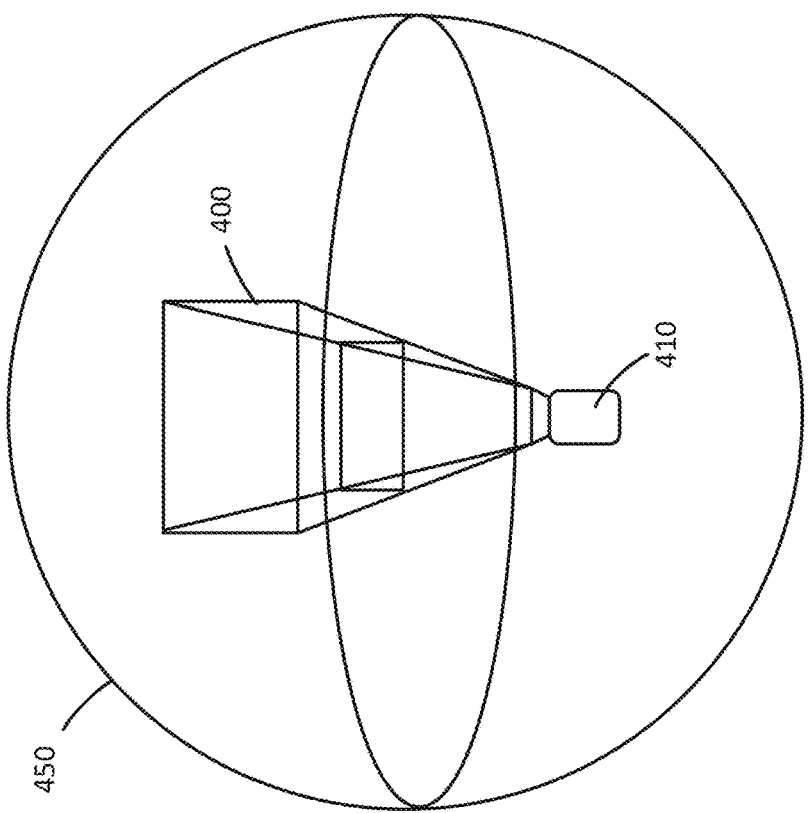
FIGS. 4A and 4B illustrate an example of how an output video stream having a narrower field of view can be generated from an input video stream having a wider field of view.
Figure 4A:
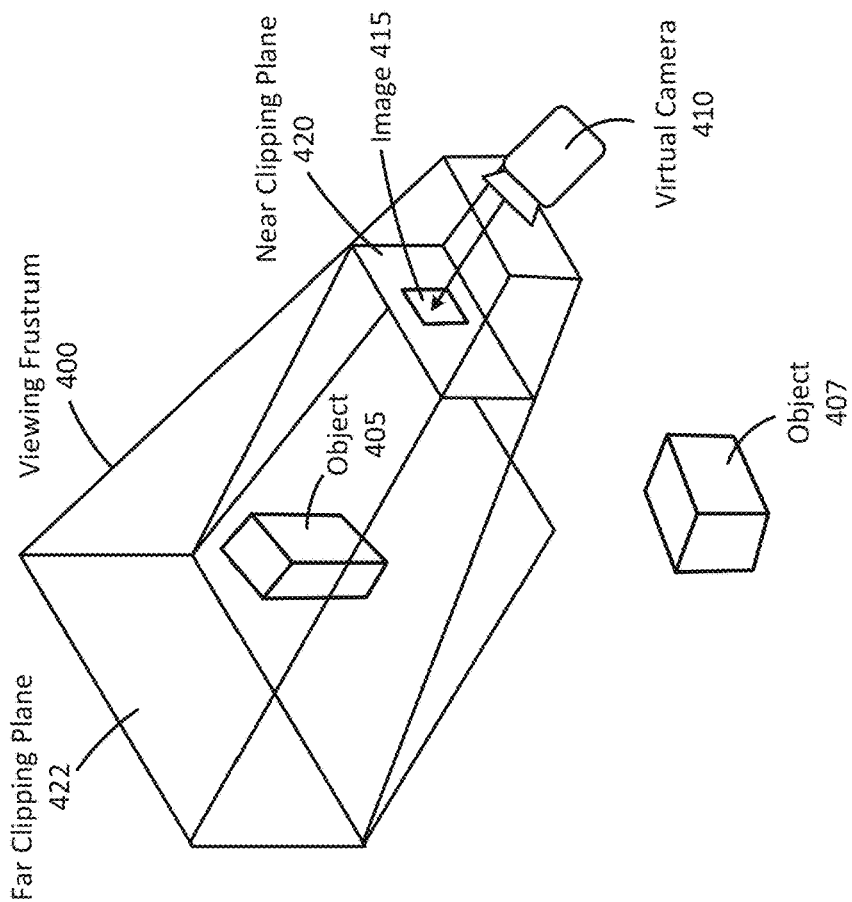

FIGS. 4A and 4B illustrate an example of how an output video stream having a narrower field of view can be generated from an input video stream having a wider field of view. As shown in FIG. 4A, images that form an output video stream can be determined based on a viewing direction, which is the direction in which a virtual camera 410 is facing. When a user device connects to a video sharing session (e.g., a videoconference), the direction of the virtual camera 410 may initially be set to the direction of the physical camera generating the input video (e.g., the camera 122 of FIG. 1). The user can change the direction of their virtual camera, for example, by physically rotating their device in a certain direction to make the virtual camera follow that direction.

Output images are determined based on a viewing frustrum 400 oriented along the viewing direction. The viewing frustrum 400 is characterized by a near clipping plane 420 and a far clipping plane 422. In general, objects located within the viewing frustrum 400 (e.g., an object 405) will be rendered visible by projecting the object onto an image 415 that forms part of the output video stream. Objects that are closer to the virtual camera 410 than the near clipping plane 420 or farther away than the far clipping plane 422 will not be rendered. Thus, objects located beyond the viewing frustrum (e.g., an object 407) will not be visible even if such objects are captured as part of the input video stream. Additionally, in some implementations, the output video stream can be generated by placing the virtual camera 410 in the center of a skybox that surrounds the virtual camera 410 on all sides. The skybox defines the farthest point that is rendered in the viewing frustrum, which may or may not be a point along the far clipping plane 420. The skybox can be used to provide a background image (e.g., a texture background) against which captured objects are rendered.

FIG. 4B shows the viewing frustum 400 as corresponding to a region within a sphere 450. The sphere 450 represents the entire 360° field of view of the camera 122. The virtual camera 410 is located at the center of the sphere 450, at the same position as the camera 122. However, the virtual camera 410 can be rotated to face a different direction. For instance, a user may be able to rotate their virtual camera to show the object 407 or the object 405, but not both objects at the same time depending on the angular distance between the objects 405 and 407.

Figure 5:
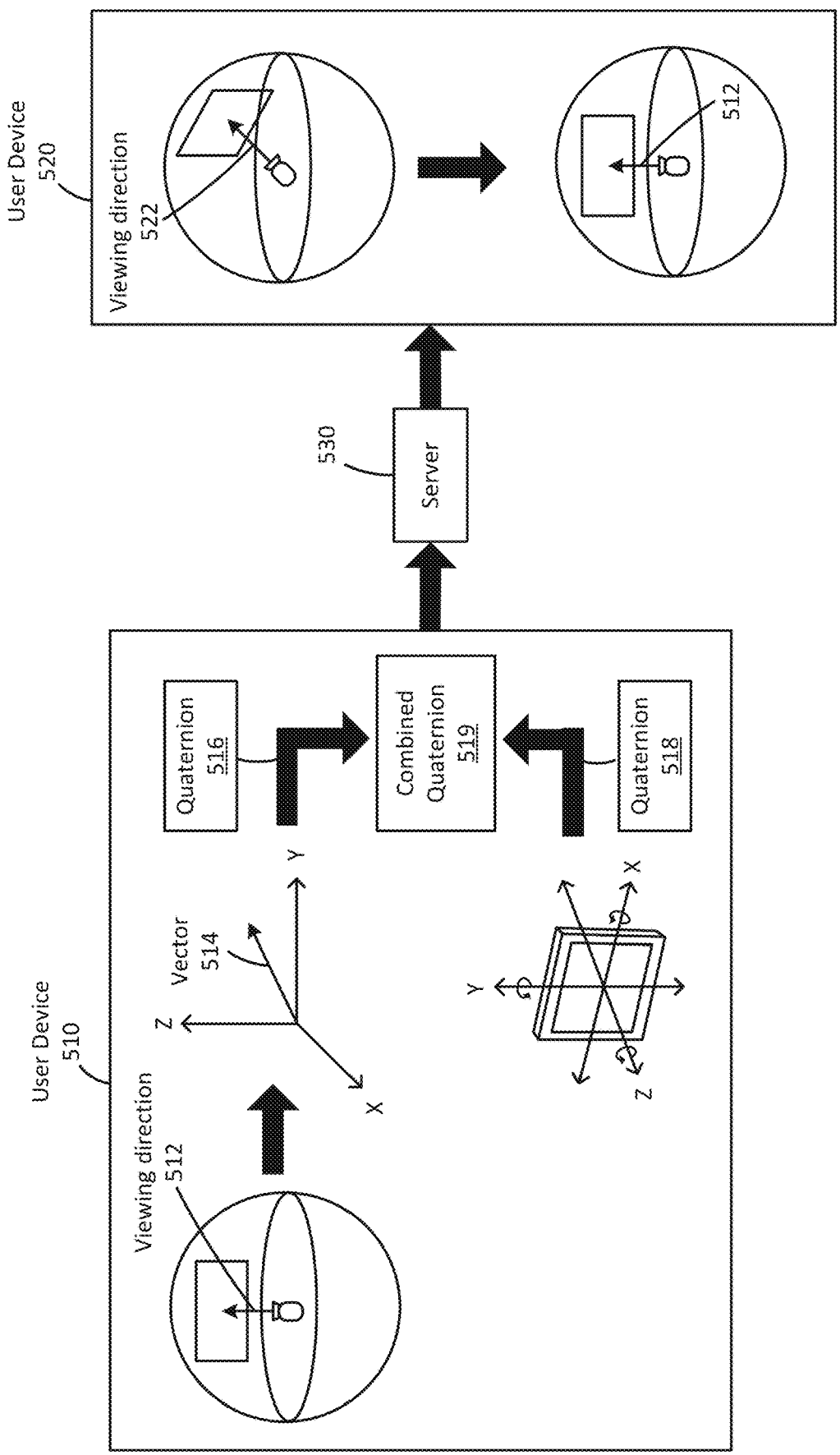
FIG. 5 illustrates a process for updating an output video stream of a first user so that the output video stream is generated based on the viewing direction of a second user, according to an embodiment.

FIG. 5 illustrates a process for updating an output video stream of a first user so that the output video stream is generated based on the viewing direction of a second user, according to an embodiment. The process depicted in FIG. 5 involves steps performed by a user device 510, a user device 520, and a server 530. The server 530 can correspond to server 150 in FIG. 1. The user devices 510 and 520 can correspond to any two user devices 130 in FIG. 1. For instance, the user device 510 could be a host device (e.g., user device 130-A) and the user device 520 could be a guest device (e.g., user device 130-B). Alternatively, the user device 510 could be a guest device and the user device 520 could be a host device. Further, in embodiments where the camera 122 can communicate with the server 150 without going through a host device, both of the user devices 510 and 520 could be guest devices.

As shown in FIG. 5, a viewing direction 512 has been specified for the user device 510. For example, the viewing direction 512 can be specified through user input to a graphical user interface provided by the user device 510. The viewing direction 512 can be represented as a vector 514 in a 3D coordinate system (e.g., XYZ). The user device 510 may generate a quaternion 516 for the vector 514. A quaternion is a numerical representation comprising a set of real-numbered coefficients for a four-dimensional vector space. Quaternions are sometimes used for performing calculations involving rotations in 3D space and are typically expressed as the sum of a real component and three imaginary components.

In the example of FIG. 5, the quaternion 516 represents an angular rotation needed to transform a default or initial direction vector (e.g., a vector representing the direction of the camera 122 or other physical camera capturing video of a 3D space) into the vector 514. If the 3D coordinate system is an XYZ coordinate system, then the angular rotation can be expressed as a rotation about an axis defined by a unit direction vector, where the unit direction vector is encoded using an X value, a Y value, and a Z value. The rotation about the axis of the unit direction vector can be expressed as an angle W. For example, if the quaternion is the set of values (W, X, Y, Z) then the unit direction vector can be defined as $$\left(\frac{X}{\sin\left(\frac{\Omega}{2}\right)}, \frac{Y}{\sin\left(\frac{\Omega}{2}\right)}, \frac{Z}{\sin\left(\frac{\Omega}{2}\right)}\right),$$

where $W = \cos\left(\frac{\Omega}{2}\right)$.

Additionally, in the example of FIG. 5, the viewing direction based on which an output video stream is generated for the user of the user device 510 corresponds to the viewing direction 512 as modified based on the orientation of the user device 510. In other words, a user device can be configured to provide its user with multiple ways to specify viewing direction, and a "final" viewing direction can be a result of combining different types of user input. For example, in some embodiments, the user of the user device 510 may specify the viewing direction 512 by swiping a finger across a touchscreen or using some other form of touch input to trigger panning of a virtual camera, e.g., toward the direction of the finger swipe. The viewing direction 512 can be modified to form the final viewing direction by changing the orientation of the user device 510 independently of performing the finger swipe. For example, the user may physically rotate the user device 510 in order to pan the virtual camera in the direction of the physical rotation. Accordingly, as shown in FIG. 5, the user device 510 can calculate a combined quaternion 519 representing an angular rotation needed to transform the default or initial direction vector to a vector associated with the final viewing direction. The combined quaternion 519 can be calculated as a product of multiplying the quaternion 516 with a quaternion 518 representing the orientation of the user device 510. As discussed earlier, device orientation can be determined using a gyroscope, e.g., to capture rotation about the X, Y, and Z axes. The multiplication operation may involve multiplying a matrix representation of the quaternion 516 with a matrix representation of the quaternion 518. An example of such a matrix representation is discussed below in connection with generating a rotated vector.

The combined quaternion 519 can be applied to an input video stream to derive an output video stream corresponding to the final viewing direction for output on a display controlled by the user device 510. In some embodiments, the generation of an output video stream involves using a combined quaternion to determine a rotated vector with XYZ components, determining a viewing frustrum based on the rotated vector (e.g., the rotated vector can be extended to form an imaginary line connecting the center points of the near and far clipping planes), and using the viewing frustrum to determine which region of a 3D space captured on video should be rendered for display at a user device. The rotated vector points in the final viewing direction and can be a result of applying a geometric transformation to a default or initial vector (e.g., a vector pointing in the direction of the camera 122). For example, if the default vector has values ($x_2$, $y_2$, $z_2$), a rotated vector $Q_v$ can be calculated as the product of multiplying the default vector with a matrix derived from the values of the combined quaternion 519, as follows:

$$Q_v = \begin{bmatrix} 1-2y^2-2z^2 & 2xy-2zw & 2xz+2yw \\ 2xy+2zw & 1-2x^2-2z^2 & 2yz-2xw \\ 2xz-2yw & 2yz+2xw & 1-2x^2-2y^2 \end{bmatrix} \begin{bmatrix} x_2 \\ y_2 \\ z_2 \end{bmatrix}$$

In addition to being used for generating an output video stream at the user device 510, the combined quaternion 519 can be transmitted to the server 530, possibly together with other viewing direction information such as the quaternions 516 and 518, for distribution to other user devices such as the user device 520. A user of the user device 520 can specify their own viewing direction in the same manner as described above with respect to determining the final viewing direction for the user device 510. For example, the user device 520 may permit its user to specify a viewing direction in multiple ways that collectively determine which direction is used for generating an output video stream at the user device 520. Thus, the user device 520 can be set to a viewing direction that is different than that of the user device 510. By sending information indicating the viewing direction for another user device (e.g., sending the combined quaternion 519), the server 530 can inform the user device 520 about which region of a 3D space the user of the other user device is currently able to see.

Further, a user device can be configured to provide its user with an option to switch to a viewing direction or POV of another user device. For example, as shown in FIG. 5, the user device 520 can be set to the viewing direction 512 (as modified based on the rotation of the user device 510). Switching viewing directions may involve substituting the combined quaternion 519 for a quaternion that would otherwise have been used to generate an output video stream at the user device 520, e.g., a quaternion corresponding to a viewing direction 522 specified by the user of the user device 520. Substituting the combined quaternion 519 for the quaternion of the user device 520 would result in an output video stream that is substantially identical to that which is presented to the user of the user device 510. To generate an output video stream using the combined quaternion 519, the user device 520 can be configured to perform processing similar to that described above with respect to forming an output video stream at the user device 510 including, for example, using the combined quaternion 519 to determine a rotated vector and a corresponding viewing frustrum, then using the viewing frustrum to determine which region of the 3D space is visible.

Methods relating to shared viewing of captured video will now be described in connection with FIGS. 6 to 9, FIG. 12, and FIG. 13. The methods depicted in these drawings can be performed in combination with each other and involve steps performed by user devices and a server in communication with the user devices. In some embodiments, one or more methods may be performed using the system depicted in FIG. 1. Although presented as a sequence of steps, each of the methods described herein may be performed with certain steps being executed in a different order, omitted, or in parallel. In certain embodiments, each of the methods may be implemented through program instructions that are stored on a non-transitory computer readable medium (e.g., a storage memory of a user device) and executed by one or more processors.

Figure 6:
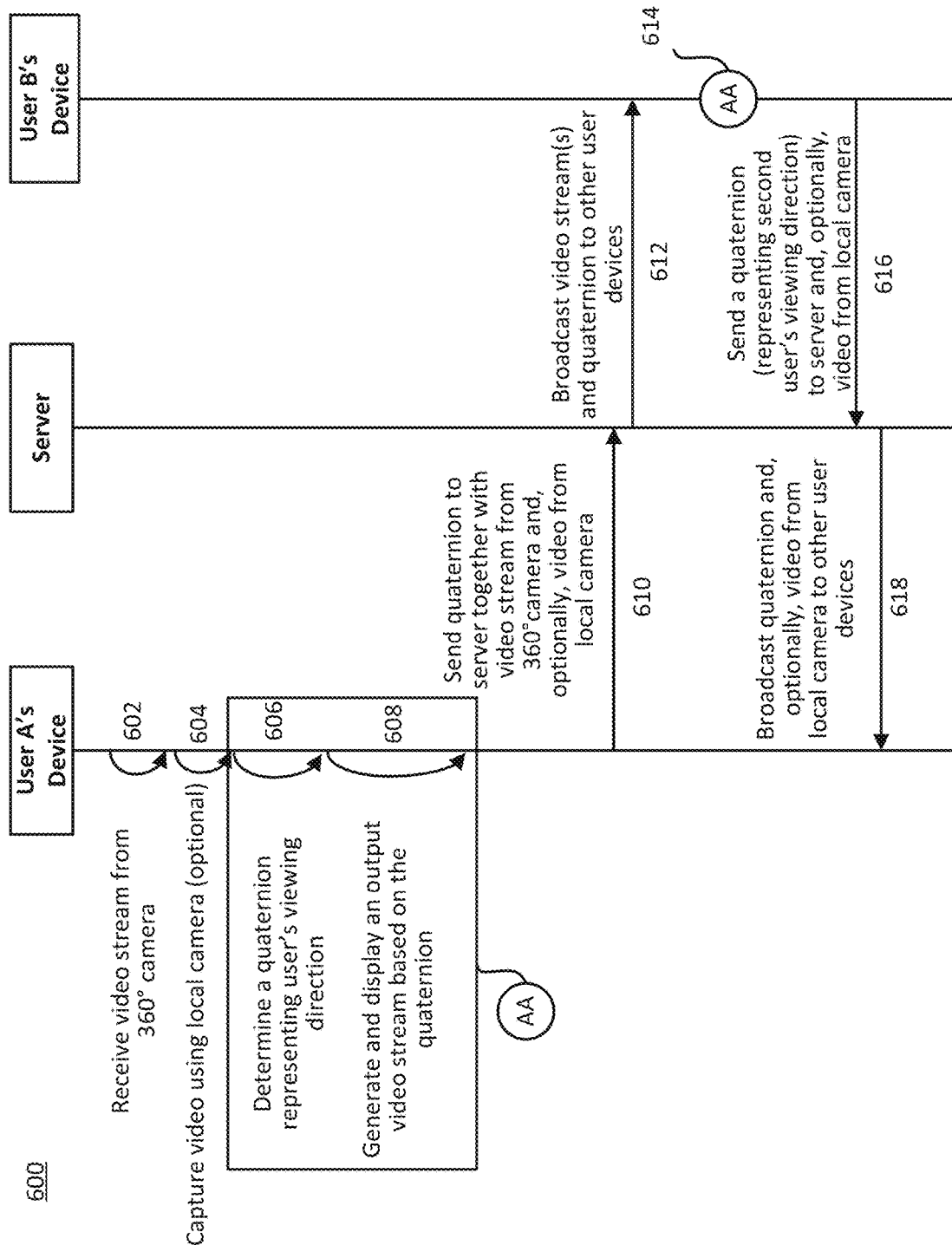
FIG. 6 is a flow diagram of a method for sending information indicating a viewing direction associated with a user device, according to an embodiment.

FIG. 6 is a flow diagram of a method 600 for sending information indicating a viewing direction associated with a user device, according to an embodiment. The information sent in the method 600 includes a quaternion which, in some embodiments, may correspond to the combined quaternion 519 of FIG. 5. The method 600 involves steps performed by a first user device (e.g., user device 130-A in FIG. 1), a second user device (e.g., user device 130-B), and a server (e.g., server 150).

At 602, the first user device receives a video stream from a 360° camera (e.g., camera 122). The video stream received in 602 includes 360° images of a 3D space. Alternatively, the video stream in 602 may have a narrower field of view (e.g., greater than 180° but less than 360°). The 360° camera may be configured to continuously generate and transmit the video stream to the first user device, e.g., using a wireless or wired connection.

At 604, the first user device optionally captures video using a local camera. For example, the local camera can be used to capture additional video of the 3D space and/or to capture video of a user of the first user device. The video capture in 604 can be performed concurrently with capturing of the video that is received in 602.

Steps 606 and 608 (collectively labeled "AA") correspond to processing that produces an output video stream for display to the user (User A) of the first user device. At 606, the first user device determines a quaternion representing User A's viewing direction, i.e., the viewing direction associated with the first user device. The viewing direction represented by the quaternion of step 606 can be a function of multiple user inputs. For example, as discussed above in connection with FIG. 5, a user may be provided with the ability to set a viewing direction through a combination of finger swiping and changing the orientation of their user device. Other types of user input are also possible depending on what type of user interface(s) are available. For example, if the first user device is equipped with a mouse or touchpad, the viewing direction may be specified by moving the mouse or swiping the touchpad toward a desired viewing direction. Accordingly, the quaternion in step 606 can be a result of combining two or more quaternions, e.g., multiplying two quaternions to produce a combined quaternion such as the combined quaternion 519 in FIG. 5.

At 608, the first user device generates an output video stream based on the quaternion determined in step 606. As discussed above, an output video stream can be generated based on a viewing frustum derived from a quaternion. After generating the output video stream, the first user device causes the output video stream to be presented on a display to User A. For example, the output video stream can be presented on the same touchscreen that is used by User A to set the viewing direction.

At 610, the first user device sends the quaternion from step 606 to the server together with the video stream received from the 360° camera in step 602. Optionally, the first user device may send a video captured by the local camera in step 604 (e.g., video depicting User A). Other sensor data collected by the first user device, such as audio of User A, can also be sent in 610.

At 612, the server broadcasts the video stream(s) received in step 610 to other user devices (e.g., the second user device) that are participating in a video sharing session with the first user device. The broadcast in step 612 can also include the quaternion from step 606. In this manner, the other user devices may receive information indicative of the viewing direction associated with the first user device.

At 614, the second user device may perform steps analogous to those performed by the first user device in 606 and 608. In particular, the second user device can be configured to permit its user (User B) to specify their own viewing direction and to generate an output video stream based on the specified viewing direction. The display of the output video stream generated by the first user device can be synchronized with the display of the output video stream generated by the second user device, so that both users are provided with the experience of seeing the 3D space at the same time even though the users are actually viewing separate video streams and are in different locations (e.g., User A may be on-site at the 3D space and User B may be at home).

Step 616 is analogous to step 610. At 616, the second user device sends a quaternion representing the viewing direction of User B to the server and, optionally, video from a local camera of the second user device. However, step 616 does not involve sending the video stream that was captured by the 360° camera since this is provided to the server by the first user device (or by the 360° camera itself, in some embodiments).

At 618, the server broadcasts the quaternion from step 616 to other user devices besides the second user device (e.g., to the first user device, as shown in FIG. 6). Thus, the first user device can receive information indicating the viewing direction associated with the second user device, in a manner similar to how the second user device receives information indicating the viewing direction associated with the first user device. The broadcast in step 618 can optionally include video captured by the local camera of the second user device (e.g., video depicting User B).

Having described an example of how information indicating a viewing direction associated with a user device can be communicated to other user devices, techniques for applying such information to update an output video stream will now be described, beginning with the method shown in FIG. 7.

Figure 7:
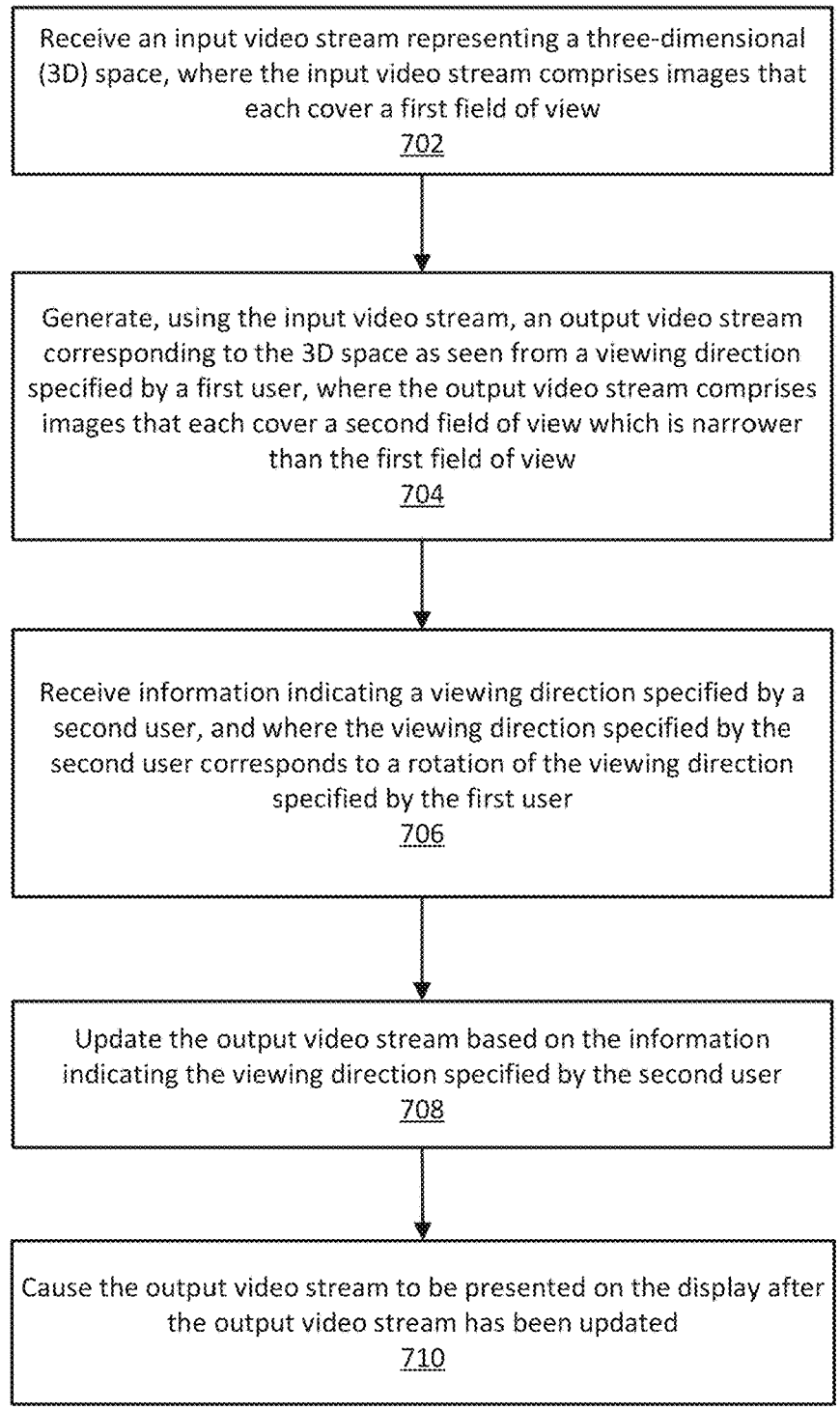
FIG. 7 is a flow diagram illustrating a method for updating an output video stream, according to an embodiment.

FIG. 7 is a flow diagram illustrating a method 700 for updating an output video stream, according to an embodiment. The method 700 can be performed by a first user device, such as any of the user devices 130 in FIG. 1.

At 702, the first user device receives an input video stream representing a 3D space and comprising a plurality of images. Each of the images in the input video stream covers a first field of view. As indicated above, such a video stream can be generated using a camera having a relatively wide field of view. Accordingly, the images that form the input video stream received in 702 may, in some embodiments, cover a field of view that is between 180° and 360°. For example, if the input video stream was captured using a 360° camera, then each of the images that form the input video stream would cover a 360° field of view.

At 704, the first user device generates an output video stream using the input view stream. The output video stream corresponds to the 3D space as seen from a viewing direction specified by a first user (the operator of the first user device). The output video stream comprises images that each cover a second field of view which is narrower than the first field of view. Accordingly, when presented on a display, the output video stream will depict a smaller region of the 3D space compared to what is captured in the input video stream. As indicated above, generating the output video stream may involve determining a viewing frustrum corresponding to the specified viewing direction. In some embodiments, the second field of view is automatically set by the first user device, for example, based on an aspect ratio of the display on which the output video stream is to be presented.

At 706, the first user device receives information indicating a viewing direction specified by a second user. The second user is an operator of a second user device that is remote from the first user device (e.g., another one of the user devices 130). The information indicating the viewing direction specified by the second user can include a quaternion that contains values usable for determining a rotated vector from a vector representing a default or initial direction (e.g., the direction in which a camera generating the input video stream is pointing), as discussed above in connection with FIG. 5. Other ways to indicate viewing direction may also be possible. For instance, in some embodiments, the viewing direction specified by the second user may be indicated using direct values instead of as a geometric transformation. The viewing direction specified by the second user is not necessarily the same as a viewing direction specified by the first user. For instance, the first user and/or the second user may specify a viewing direction that is different from the default/initial direction. Thus, the viewing direction specified by the second user may correspond to a rotation of the viewing direction specified by the first user.

At 708, the first user device updates the output video stream based on the information indicating the viewing direction specified by the second user. Examples of different ways in which an output video stream can be updated are described below. For instance, the updating in step 708 may involve switching to using the viewing direction specified by the second user for determining which portion of the 3D space is visible to the first user. As another example, the output video stream may be updated to include one or more graphical elements that indicate the second user's viewing direction.

At 710, the first user device causes the output video stream to be presented on the display after the output video stream has been updated according to step 708. For instance, the first user device may be configured to generate control signals for driving the display using the output video stream.

FIG. 8 is a flow diagram illustrating a method 800 for updating an output video stream to correspond to a viewing direction associated with another user device, according to an embodiment. For example, the method 800 can implement the updating in step 708 of FIG. 7. The method 800 can be performed by a first user device, such as any of the user devices 130 in FIG. 1.

Figure 10:
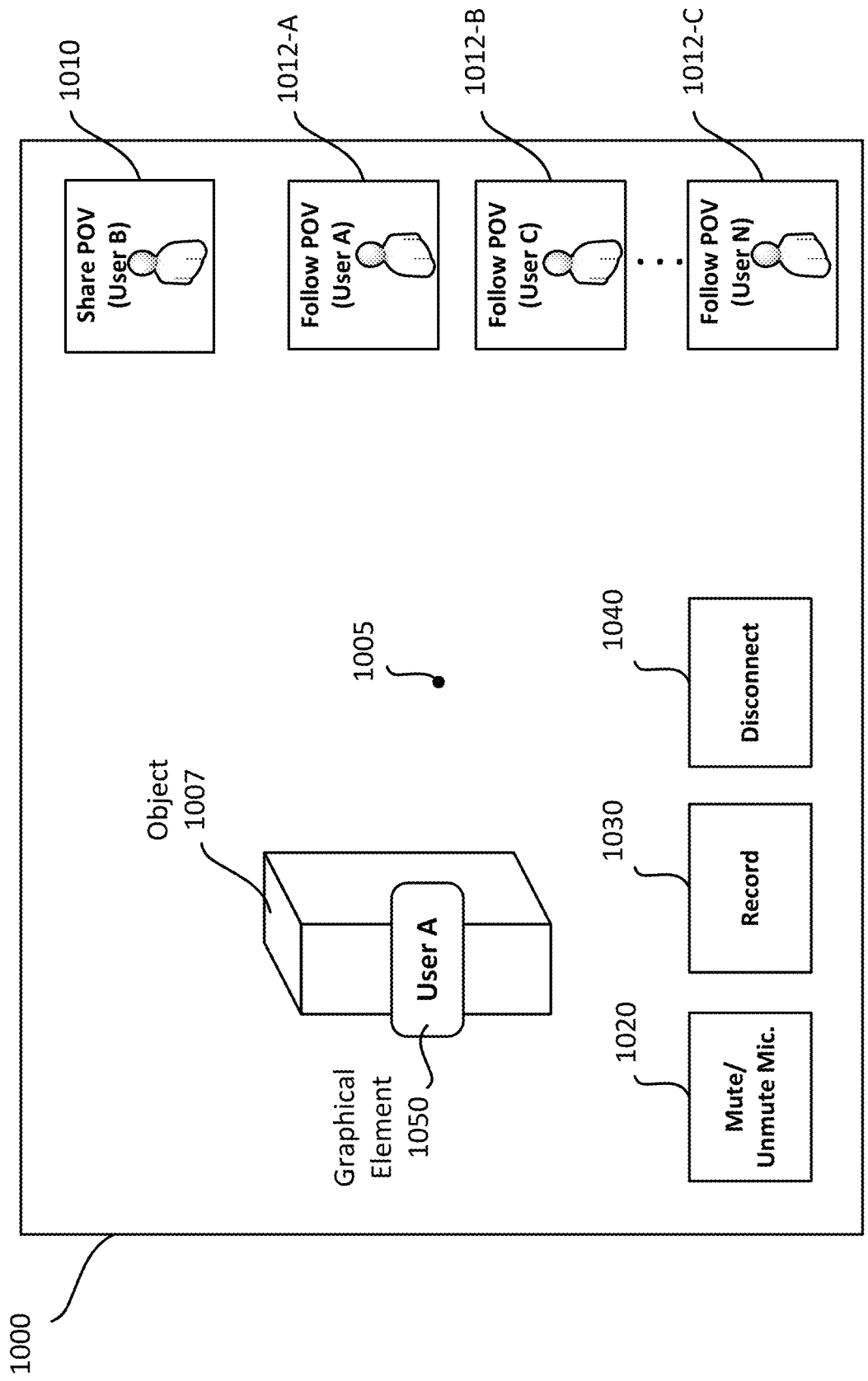
FIG. 10 illustrates an example graphical user interface including a graphical element relating to a viewing direction associated with another user device, according to an embodiment.

At 802, the first user device determines that a point-of-view (POV) of a second user (an operator of a second user device) should be used to generate an output video stream for a first user (the operator of the first user device). This determination can be based on the first user choosing to follow the POV of the second user. For example, as shown in FIG. 10, a user device can be configured to present a graphical user interface that includes an option to follow the POV of another user. Alternatively, the determination in step 802 can be based on the second user choosing to share their POV with other users. For example, in some embodiments, output video streams are generated as part of a videoconference and a user (e.g., a meeting host or user who currently has control over the meeting) is provided with an option to impose their own POV onto other users, thereby overriding any viewing directions specified by the other users.

At 804, the first user device applies a quaternion generated by the second user device to generate an updated output video stream. The quaternion generated by the second user device can be communicated to the first user device using, for example, the method of FIG. 6. From the discussion of FIG. 5 above, it will be understood that the updating of the output video stream in step 804 may involve switching from using a quaternion corresponding to a viewing direction specified by the first user to instead use the quaternion generated by the second user device. In this manner, the POV of a local user (in this case, the first user) is replaced with the POV another user (e.g., the second user) so that the output video stream is updated to show a 3D space from a viewing direction specified by the second user.

At 806, the first user device causes the output video stream, which has now been updated to reflect the POV of the second user, to be displayed to the first user. If the determination in step 802 was based on the second user choosing to share their POV with other users, then steps 804 and 806 may be repeated by other user devices besides the first user device. Further, as mentioned above, an output video stream can be presented in synchronization with presentation of output video streams at other user devices. For example, a third user device may generate an additional output video stream using the same input video stream as the first user device. Due to the third user choosing to follow the POV of the second user or the second user choosing to share their POV with other users, the additional output video stream may be configured to show the 3D space from the viewing direction specified by the second user. In this manner, both the first user and the third user can view real-time video of the 3D space from the perspective of second user.

Figure 9:
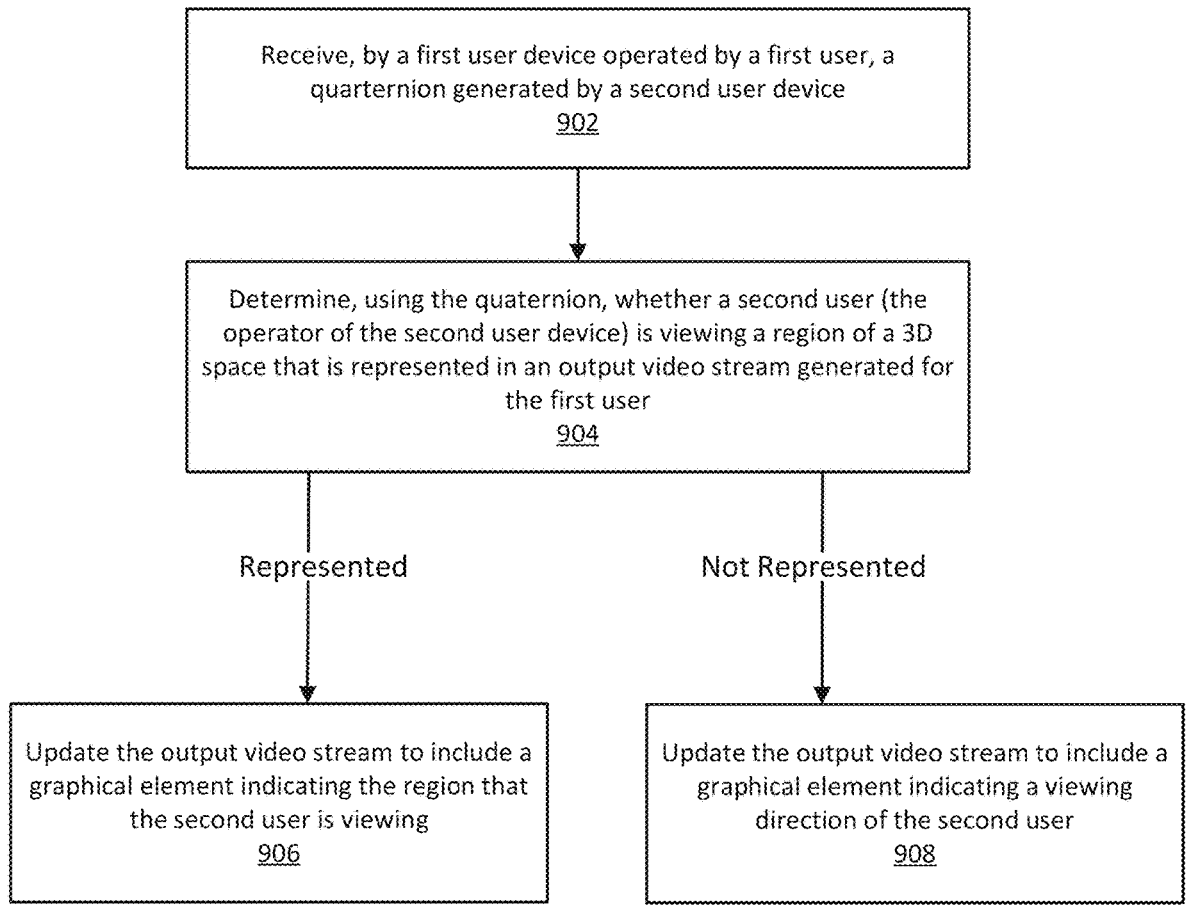
FIG. 9 is a flow diagram illustrating a method for updating an output video stream to include a graphical element based on a viewing direction associated with another user device, according to an embodiment.

FIG. 9 is a flow diagram illustrating a method 900 for updating an output video stream to include a graphical element based on a viewing direction associated with another user device, according to an embodiment. For example, the method 900 can implement the updating in step 708 of FIG. 7. The method 900 can be performed by a first user device, such as any of the user devices 130 in FIG. 1.

At 902, the first user device receives a quaternion generated by a second user device (e.g., another user device 130). The quaternion generated by the second user device can be communicated to the first user device using, for example, the method of FIG. 6.

At 904, the first user device uses the quaternion to determine whether a second user (the operator of the second user device) is viewing a region of a 3D space that is represented in an output video stream generated for a first user (the operator of the first user device). For example, the first user device may use the quaternion to determine a rotated vector representing a viewing direction specified by the second user, then determine whether the rotated vector lies within a viewing frustrum of the first user. If the rotated vector is inside the first user's viewing frustrum, this indicates that the virtual camera of the second user is pointed toward a region that is currently visible to the first user. Otherwise, the virtual camera of the second user is pointed toward a region that is not visible from the POV of the first user.

If the region viewed by the second user is represented in the output video stream generated for the first user, then the method 900 proceeds to step 906. At 906, the first user device updates the output video stream to include a graphical element indicating the region that the second user is viewing. As shown in FIG. 10, such a graphical element can be introduced without changing the POV of the first user.

FIG. 10 illustrates an example graphical user interface (GUI) 1000 according to an embodiment. The GUI 1000 is configured to present an output video stream generated for a particular user (in this case, User B). A center 1005 of the GUI 1000 corresponds to the current viewing direction for User B. As shown in FIG. 10, the GUI 1000 can include various options for providing user input. For example, the GUI 1000 can include an option 1010 for sharing User B's POV. Further, the GUI 1000 can include options 1012 for following the POV of another user. For example, selecting an option 1012-A may cause the output video stream to be presented from the perspective of User A, selecting an option 1012-B may cause the output video stream to be presented from the perspective of User B, and selecting an option 1012-C may cause the output video stream to be presented from the perspective of User N. In the example of FIG. 10, the user interface options are superimposed over the output video stream. However, in some embodiments, input elements such as the above-mentioned options can be presented in an area of the GUI 1000 that is separate from an area where the output video stream is being presented. For example, the output video stream could be presented in a window or frame and the options could be placed along one or more edges of the window/frame.

The GUI 1000 can be configured to permit users to videoconference with each other. For example, in some embodiments, each of the options 1010 and 1012 may correspond to a window that shows video of a corresponding user. For instance, option 1010 may display video of User B as captured by a local camera of User B's device. Similarly, option 1012-A may display video of User A as captured by a local camera of User A's device. In this manner, the GUI 1000 can be configured to permit users to see each other while also sharing video of a 3D space. GUI 1000 can include additional videoconference-related options such as an option 1020 to toggle muting of a microphone, an option 1030 to record the content being shown through the GUI 1000, and an option 1040 to disconnect from the videoconference.

As shown in FIG. 10, the output video stream for User B can include a graphical element 1050 indicating a region that is being viewed by User A. For instance, the graphical element 1050 can be an icon (e.g., a box labeled with User A's name) that is centered over a point corresponding to User A's viewing direction. Thus, the GUI 1000 can be updated to show that another user is viewing a region currently visible to User B. In the example of FIG. 10, the virtual camera of User A is pointed toward an object 1007 that is visible to User B. However, as indicated by the object 1007 being located away from the center 1005, User B's virtual camera is not currently pointed directly at the object 1007. Similar graphical elements can be added when other users (e.g., User C or User N) are also viewing regions that are visible to User B.

Returning to FIG. 9, if the region viewed by the second user is not represented in the output video stream generated for the first user, then the method 900 proceeds to step 908. At 908, the first user device updates the output video stream to include a graphical element indicating the viewing direction of the second user. For example, as shown in FIG. 11, the viewing direction of another user can be indicated using one or more directional arrows.

Figure 11:
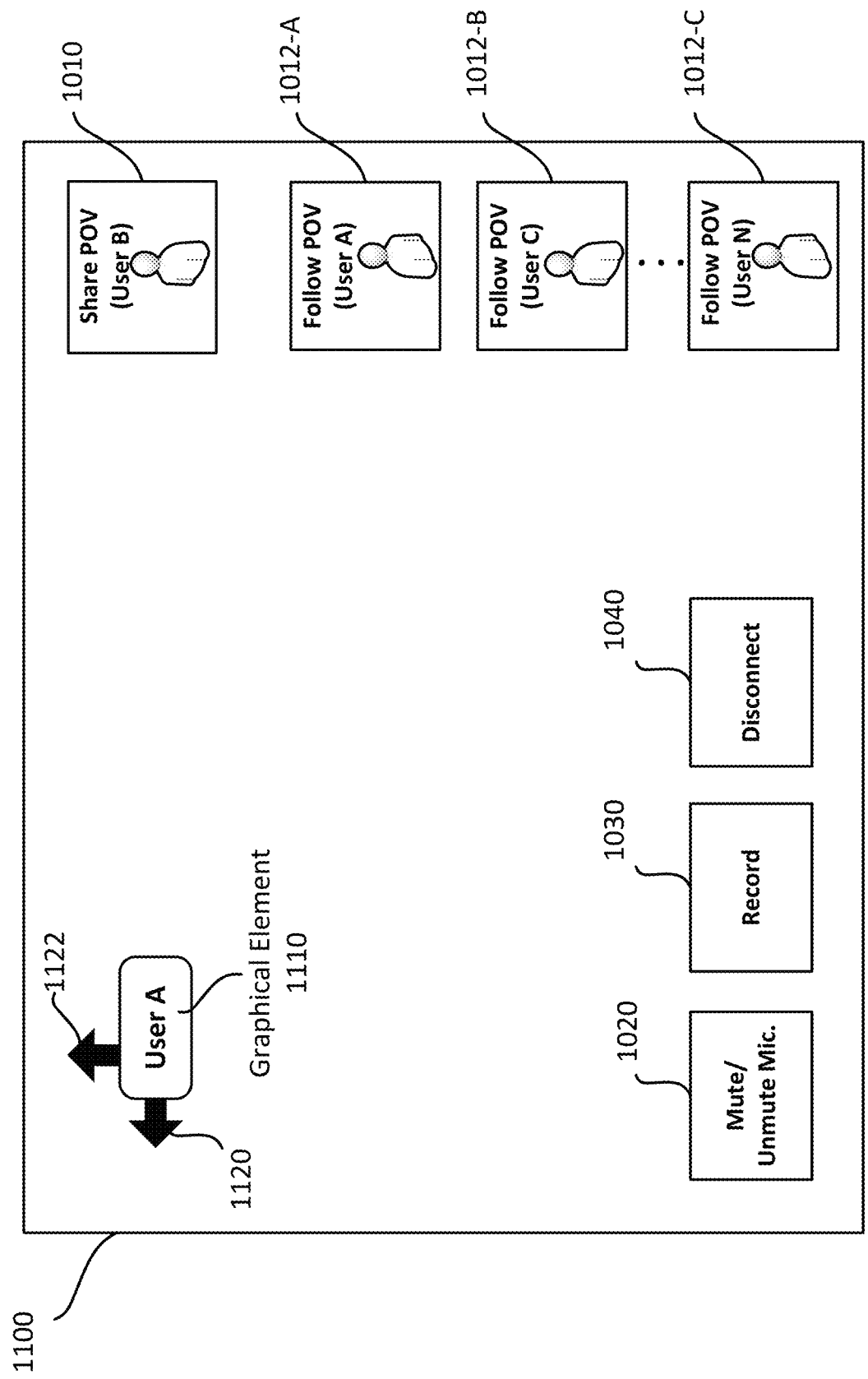
FIG. 11 illustrates an example graphical user interface including a graphical element relating to a viewing direction associated with another user device, according to an embodiment.

FIG. 11 illustrates an example GUI 1100 according to an embodiment. GUI 1100 is similar to the GUI 1000 of FIG. 10, except that a graphical element 1110 is substituted for the graphical element 1050. The graphical element 1110 indicates that a region being viewed by User A is not currently visible in the GUI 1100, e.g., because User A's viewing direction is outside of User B's viewing frustrum. Although shown as being of similar shape to the graphical element 1050, the graphical element 1110 can have a different shape, color, and/or other characteristic so that a user viewing the GUI 1100 (in this case, User B) can easily distinguish between a graphical element generated for the scenario in step 906 of FIG. 9 (e.g., graphical element 1050) and a graphical element generated for the scenario in step 908 (e.g., graphical element 1110). For example, as shown in FIG. 11, the graphical element 1110 can include one or more arrows (1120 and 1122) that point toward User A's viewing direction.

In the example of FIG. 11, the arrows 1120 and 1122 are included to indicate that the User A is looking toward a region that is off the upper left of the region currently being shown on User B's display. Directional arrows are one way to visually indicate where another user is looking, but other methods are possible. For instance, in some embodiments, the viewing direction of User A may be indicated by highlighting a segment along the perimeter of the graphical element 1110.

FIG. 10 and FIG. 11 are simplified examples in which a GUI includes a graphical element indicating a viewing direction or viewed region of another user. In practice, a GUI can be configured to concurrently display multiple graphical elements. For example, a GUI generated for User B may include one or more instances of graphical element 1050 and one or more instances of graphical element 1110, where each instance of graphical element 1050 or 1110 indicates where a user other than User B is looking. Thus, a separate graphical element 1110 or 1050 could be generated for every user besides User B. Alternatively, graphical elements could be generated for only a subset of users (e.g., User A and User C, but not User N). For example, User B may be provided with an option to set a limit on the number of graphical elements that are displayed at any given time, in order to avoid cluttering the images being presented in User B's output video stream.

Figure 12:
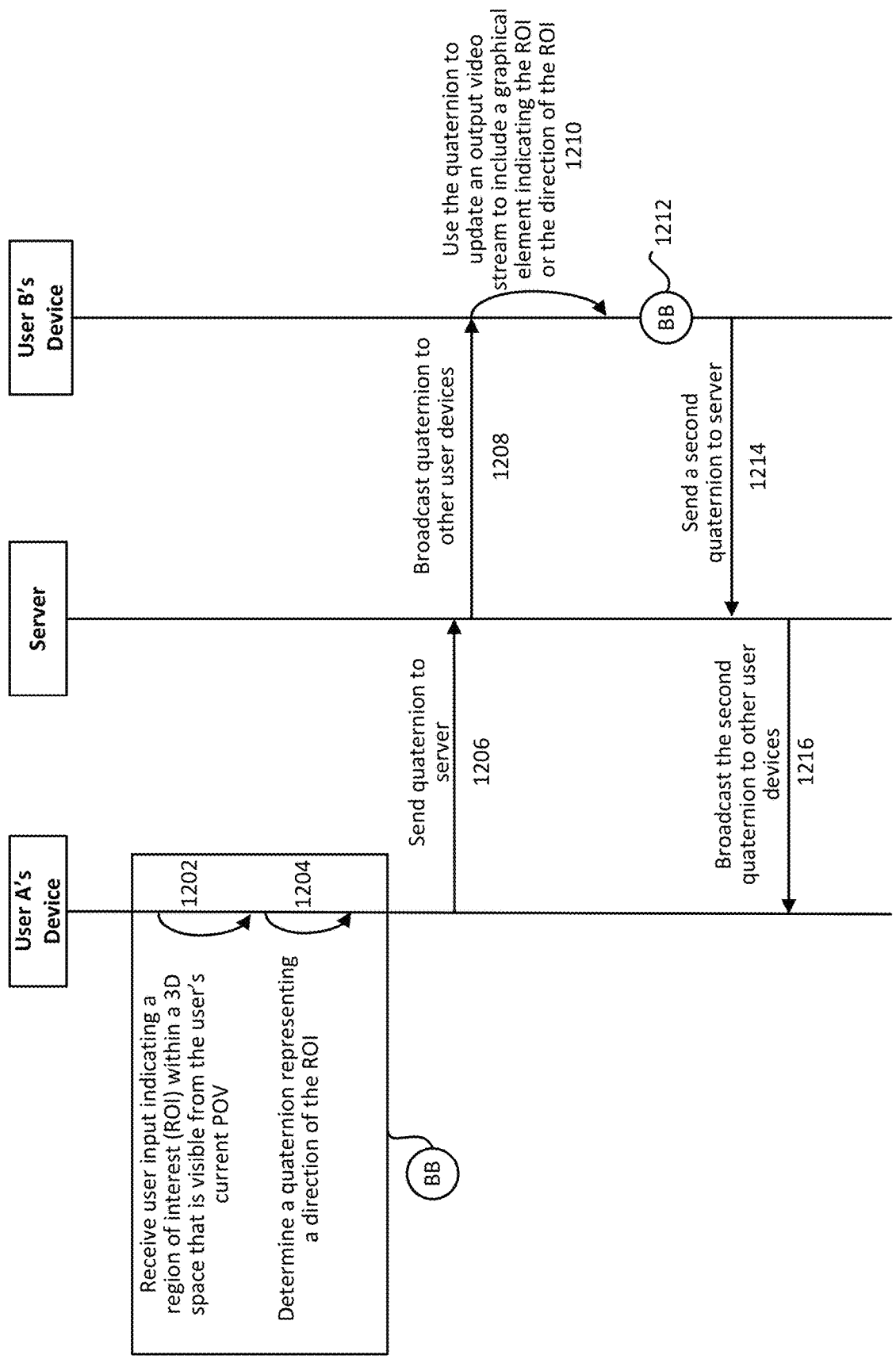
FIG. 12 is a flow diagram of a method for indicating a region of interest, according to an embodiment.

FIG. 12 is a flow diagram of a method 1200 for indicating a region of interest (ROI) according to an embodiment. The method 1200 involves sending a quaternion from a first user device to a second user device, in a manner similar to that described above in connection with the method 600 of FIG. 6. In the method 1200, the quaternion that is sent represents a direction of an ROI. Although presented using separate flow diagrams, the methods 600 and 1200 can be performed together on the same device. For example, a user device can be configured to send an updated quaternion to a server whenever the viewing direction associated with the user device changes. Further, the same user device can be configured to send the server a quaternion representing the direction of an ROI whenever the operator of the user device identifies a new ROI to share with other users.

Steps 1202 and 1204 (collectively labeled "BB") correspond to processing for determining a quaternion representing a direction of an ROI. At 1202, the first user device receives input from its user (User A) indicating an ROI within a 3D space that is visible from the current POV of the user. The input can be provided in various ways depending on what input devices are available. For example, the ROI may be indicated by tapping on a corresponding location (e.g., a double-tap gesture) while an output video stream showing the 3D space is being presented on a touchscreen. Alternatively, User A may indicate the ROI by using a mouse or other pointing device to move a screen cursor to the location of the ROI and then clicking a button on the pointing device.

In some embodiments, the user input in step 1202 indicates a center of the ROI, but does not specify how large the ROI is or the exact boundaries of the ROI. In other embodiments, the user input in step 1202 may indicate the ROI in greater detail. For instance, the user input in 1202 may involve drawing a circle representing an area covered by the ROI.

At 1204, the first user device determines a quaternion representing a direction of the ROI. Determining the quaternion may involve identifying a vector that points toward the center of the ROI and then calculating a quaternion that, when applied to a default or initial vector (e.g., a vector pointing in the direction of the camera 122) transforms the default or initial vector into the vector pointing toward the center of the ROI.

At 1206, the first user device sends the quaternion from step 1204 to a server (e.g., server 150). The quaternion may be sufficient in itself to identify the ROI. However, additional information can be sent with the quaternion depending on the specificity with which the user indicated the ROI in step 1202. For instance, if the user indicated the boundaries of the ROI, then the boundaries (e.g., the radius of a circle around the ROI) can be sent to the server as well.

At 1208, the server broadcasts the quaternion received from the first user device to other user devices that are participating in a video sharing session with the first user device. For example, as shown in FIG. 12, a second user device (operated by User B) is configured to receive the quaternion from the server.

Figure 13:
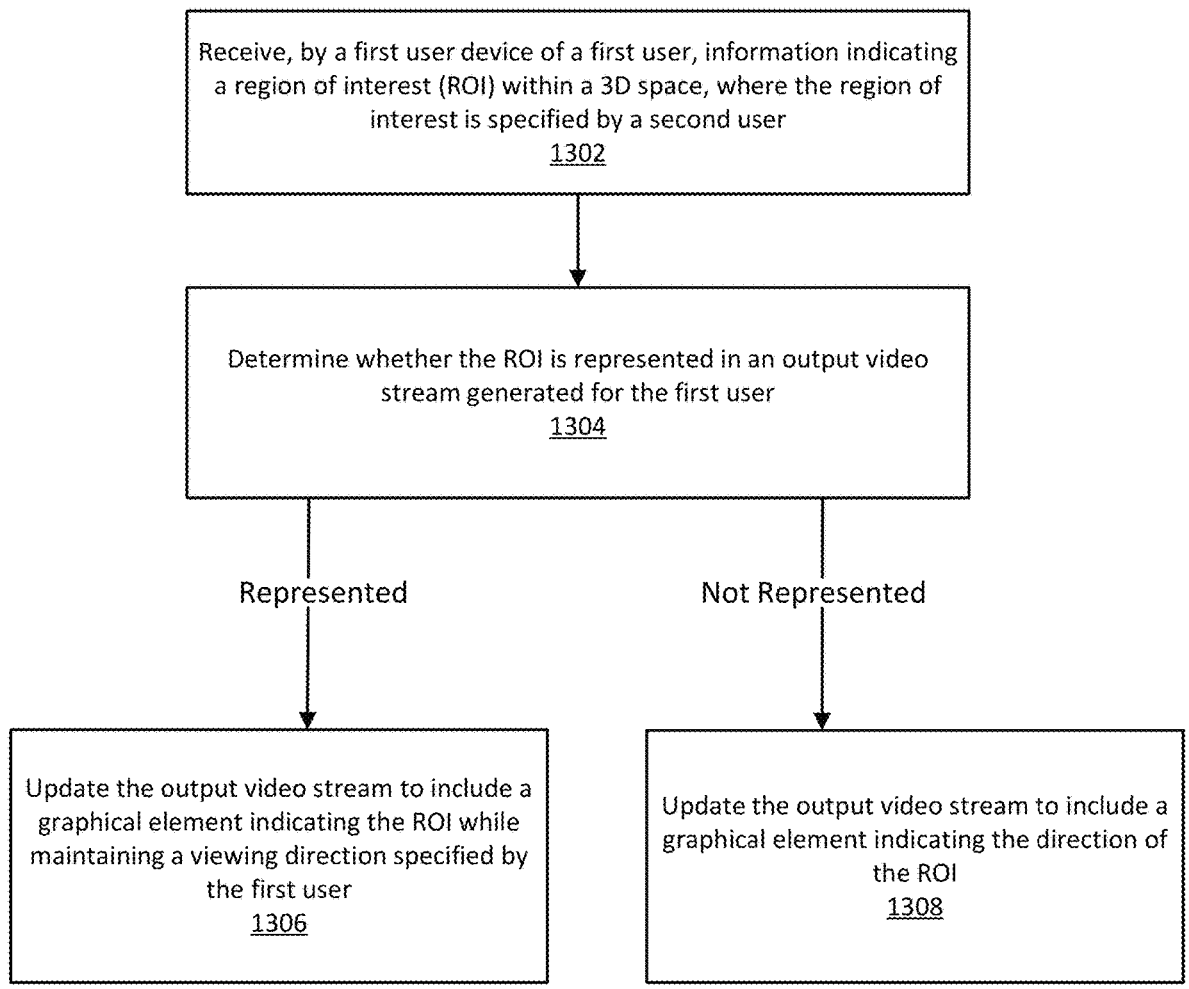
FIG. 13 is a flow diagram of a method for updating an output video stream to include a graphical element relating to a region of interest, according to an embodiment.

At 1210, the second user device uses the quaternion to update an output video stream for presentation to User B. Similar processing may be performed by other user devices that received the quaternion during the broadcast in step 1208. The output video stream is updated to include a graphical element indicating the ROI (e.g., as a circle with colored highlighting) or a graphical element indicating the direction of the ROI (e.g., an icon with directional arrows, similar to the graphical element 1110 in FIG. 11). An example method for determining which of these two types of graphical elements is used to update an output video stream is shown in FIG. 13, discussed below.

At 1212, the second user device may perform steps analogous to those performed by the first user device in 1202 and 1204. In particular, the second user device can be configured to permit User B to specify their own ROI and to determine a second quaternion representing a direction of such an ROI.

Step 1214 is analogous to step 1206. At 1214, the second user device sends the second quaternion to the server. In general, any user device participating in a video sharing session can be configured to permit its user to indicate a ROI and to send information relating to the ROI (e.g., a quaternion) to a server for distribution to other user devices.

At 1216, the server broadcasts the second quaternion to other user devices besides the second user device (e.g., to the first user device, as shown in FIG. 12). The first user device can then use the second quaternion to update an output video stream generated for User A, similar to the processing in step 1210.

FIG. 13 is a flow diagram of a method 1300 for updating an output video stream to include a graphical element relating to an ROI, according to an embodiment. The method 1300 can be performed by a first user device, such as any of the user devices 130 in FIG. 1.

Figure 14:
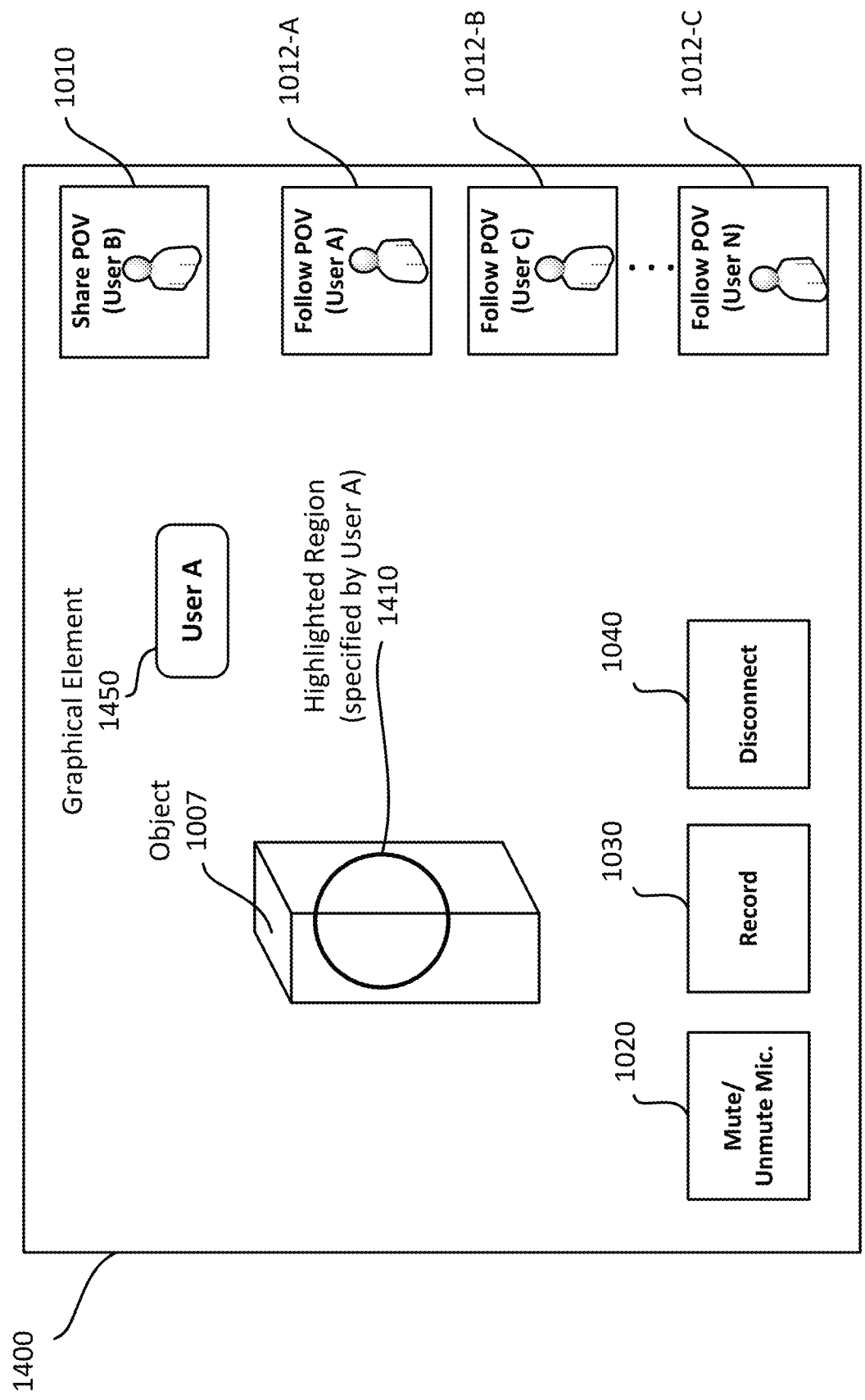
FIG. 14 illustrates an example graphical user interface including a graphical element relating to a region of interest, according to an embodiment.

At 1302, the first user device receives information indicating an ROI within a 3D space. The ROI is specified by a second user operating a second user device. The ROI can be communicated by a server such as the server 150. As discussed above in connection with FIG. 12, information indicating an ROI can be in the form of a quaternion that represents a direction of the ROI. Thus, a user who specifies an ROI can have two direction vectors associated therewith, along with a corresponding quaternion for each direction vector. The first vector represents the user's viewing direction. The second vector represents the direction of the ROI. These two vectors are not necessarily the same. For example, as shown in FIG. 14 (discussed below), a user may have their virtual camera pointed in a certain direction, but may also specify an ROI that is in a different direction than their virtual camera.

At 1304, the first user device determines whether the ROI is represented in an output video stream generated for the first user. The determination in 1304 can be performed in a similar manner to the determination in step 904 of FIG. 9. For example, the first user device may use a quaternion received as part of the information in step 1302 to determine a rotated vector (e.g., rotated relative to an initial/default vector) that represents the direction of the ROI. Once this rotated vector has been determined, the first user device may then determine whether the rotated vector lies within a viewing frustrum of the first user. If the rotated vector is inside the first user's viewing frustrum, this indicates that the ROI is centered at a point that is currently visible to the first user, and therefore represented in the first user's output video stream. Otherwise, the ROI is centered at a point that is not visible from the POV of the first user, and therefore not represented in the first user's output video stream.

If the ROI is represented in the output video stream generated for the first user, then the method 1300 proceeds to step 1306. At 1306, the first user device updates the output video stream to include a graphical element indicating the ROI while maintaining a viewing direction specified by the first user.

If the ROI is not represented in the output video stream generated for the first user, then the method 1300 proceeds to step 1308. At 1308, the first user device updates the output video stream to include a graphical element indicating the direction of the ROI. Such a graphical element may include, for example, one or more directional arrows pointing in the direction of the ROI, similar to the graphical element 1110 in FIG. 11.

FIG. 14 illustrates an example GUI 1400 according to an embodiment. As shown in FIG. 14, the GUI 1400 can include the same user interface elements shown in the GUI 1000 of FIG. 10. In the example of FIG. 14, the POV of User B, for whom an output video stream is generated for display through the GUI 1400, is such that a region being viewed by User A is also visible to User B. This is shown in FIG. 14 by the inclusion of a graphical element 1450, which is analogous to the graphical element 1050 of FIG. 10. However, unlike the example of FIG. 10, User A does not have their virtual camera pointed at the object 1007. Instead, User A has specified a viewing direction that is elsewhere. Nevertheless, User A has brought the object 1007 to the attention of other users, such as User B, by specifying an ROI 1410 that includes the object 1007. For example, as shown in FIG. 14, User A may cause the ROI 1410 to appear as a highlighted circle on the display of any user to whom the object 1007 is currently visible.

The size and shape of an ROI can vary depending on implementation. In some embodiments, the boundaries of an ROI are determined locally by the user device generating the output video stream. For example, in FIG. 14, User B's device may be pre-configured to draw the ROI 1410 as a circle of fixed radius (e.g., a certain number of display pixels). In some embodiments, a user may specify a boundary of an ROI. For example, the User A may specify an ROI by drawing a circle and information about the circle (such as center and radius) can be sent to other user devices, e.g., as part of step 1302 in FIG. 13, so that a corresponding circle can be drawn on the displays of other user devices.

Some portions of this description describe the embodiments of the disclosure in terms of algorithms and operations. These operations are understood to be implemented by computer programs or equivalent electrical circuits, machine code, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

In some embodiments, a software module is implemented with a computer program product comprising a non-transitory computer-readable storage medium containing computer program code, which can be executed by one or more computer processors for performing any or all of the steps, operations, or processes described. Examples of a non-transitory storage medium include, but are not limited to, a magnetic disk or tape, optical storage media such as compact disk (CD) or digital versatile disk (DVD), flash memory, or other memory devices.

The specification and drawings are, accordingly, to be regarded in an illustrative rather than a restrictive sense. It will, however, be evident that additions, subtractions, deletions, and other modifications and changes may be made thereunto without departing from the broader spirit and scope set forth in the claims. Thus, although specific embodiments have been described, these are not intended to be limiting. Various modifications and equivalents are within the scope of the following claims.

What is claimed is:

1. A method for shared viewing of video among remote users, the method comprising:
   receiving, by a first computer device operated by a first user, an input video stream representing a three-dimensional (3D) space, wherein the input video stream comprises images that each cover a first field of view, the input video stream corresponding to real-time video captured by a camera located in the 3D space;
   generating, by the first computer device and using the input video stream, an output video stream corresponding to the 3D space as seen from a viewing direction specified by the first user, wherein the output video stream comprises images that each cover a second field of view, the second field of view being narrower than the first field of view, and wherein the viewing direction of the first user is specified relative to a default or initial direction associated with the camera;

receiving, by the first computer device, information indicating a viewing direction specified by a second user, wherein:
the second user is a user of a second computer device remote from the first computer device,
the first computer device is located in the 3D space together with the camera,
the viewing direction specified by the second user corresponds to a rotation of the viewing direction specified by the first user and is specified relative to the default or initial direction associated with the camera, and
the viewing direction specified by the second user is received by the first computer device as an indication of a perspective from which a second output video stream being displayed to the second user is generated, using the real-time video captured by the camera;
updating, by the first computer device, the output video stream based on the information indicating the viewing direction specified by the second user, wherein the updating of the output video stream comprises:
determining, based on the viewing direction specified by the second user, a position or pointing direction for a first graphical element that will indicate a region the second user is viewing, and
updating the output video stream to include the first graphical element;
causing, by the first computer device, the output video stream to be presented on a display of the first user after the updating of the output video stream, wherein the output video stream is presented simultaneously with a second graphical element representing an option to switch from showing the 3D space as seen from the viewing direction specified by the first user to showing the 3D space from the viewing direction specified by the second user, the second graphical element corresponding to a window displaying video captured by a camera local to the second user;
receiving information indicating a region of interest within the 3D space, wherein the information indicating the region of interest comprises a size, boundary, and location of the region of interest as drawn by the second user;
determining that the region of interest is represented in the output video stream; and
further updating the output video stream to include a third graphical element indicating the region of interest, wherein the third graphical element is displayed simultaneously with the first graphical element and the second graphical element and according to the size, boundary, and location of the region of interest as drawn by the second user.

2. The method of claim 1, wherein the camera has a 360° field of view, wherein the information indicating the viewing direction specified by the second user is received from a server that is in communication with the second computer device, and wherein the input video stream is received from the camera or the server.

3. The method of claim 1, wherein the updating of the output video stream comprises:
determining the position for the first graphical element as a position associated with a region of the 3D space that is currently visible in the output video stream.

4. The method of claim 1, wherein the updating of the output video stream comprises:
determining the pointing direction for the first graphical element as a pointer to a region of the 3D space that is not currently visible in the output video stream.

5. The method of claim 1, further comprising:
updating the output video stream to switch from showing the 3D space as seen from the viewing direction specified by the first user to showing the 3D space from the viewing direction specified by the second user, in response to an input applied to the second graphical element by the first user.

6. The method of claim 5, wherein the output video stream, after being updated to show the 3D space from the viewing direction specified by the second user, is presented on the display of the first user in synchronization with presentation of an additional output video stream on a display of a third user, and wherein the additional output video stream shows the 3D space from the viewing direction specified by the second user.

7. The method of claim 1, further comprising:
rotating the viewing direction specified by the first user based on input from the first user; and
after rotating the viewing direction specified by the first user, causing information indicating the viewing direction specified by the first user to be communicated to the second computer device, wherein the information indicating the viewing direction specified by the first user is usable for updating the second output video stream being displayed to the second user, and wherein at a time that the information indicating the viewing direction specified by the first user is communicated to the second computer device, the second output video stream corresponds to the 3D space as seen from the viewing direction specified by the second user.

8. The method of claim 7, wherein the input from the first user comprises at least one of:
a physical rotation captured using a gyroscope in the first computer device; or
a touch input applied to the display of the first user.

9. The method of claim 1, wherein the first graphical element comprises a text label identifying the second user.

10. An apparatus comprising:
one or more processors;
a display viewable by a first user; and
a memory storing instructions that, when executed by the one or more processors, cause the one or more processors to:
receive an input video stream representing a three-dimensional (3D) space, wherein the input video stream comprises images that each cover a first field of view, the input video stream corresponding to real-time video captured by a camera located in the 3D space;
generate, using the input video stream, an output video stream corresponding to the 3D space as seen from a viewing direction specified by the first user, wherein the output video stream comprises images that each cover a second field of view, the second field of view being narrower than the first field of view, and wherein the viewing direction of the first user is specified relative to a default or initial direction associated with the camera;
receive information indicating a viewing direction specified by a second user, wherein:
the second user is a user of a computer device remote from the apparatus,
the apparatus and the first user are located in the 3D space together with the camera, the viewing direction specified by the second user
corresponds to a rotation of the viewing direction
specified by the first user and is specified relative
to the default or initial direction associated with
the camera, and
the viewing direction specified by the second user is
received as an indication of a perspective from
which a second output video stream being displayed to the second user is generated, using the
real-time video captured by the camera;
update the output video stream based on the information indicating the viewing direction specified by the
second user, wherein to update the output video
stream, the one or more processors are configured to:
determine, based on the viewing direction specified
by the second user, a position or pointing direction
for a first graphical element that will indicate a
region the second user is viewing, and
update the output video stream to include the first
graphical element;
cause the output video stream to be presented on the
display after the output video stream has been updated,
wherein the output video stream is presented simultaneously with a second graphical element representing
an option to switch from showing the 3D space as seen
from the viewing direction specified by the first user to
showing the 3D space from the viewing direction
specified by the second user, the second graphical
element corresponding to a window displaying video
captured by a camera local to the second user;
receive information indicating a region of interest within
the 3D space, wherein the information indicating the
region of interest comprises a size, boundary, and
location of the region of interest as drawn by the second
user;
determine that the region of interest is represented in the
output video stream; and
further update the output video stream to include a third
graphical element indicating the region of interest,
wherein the third graphical element is displayed simultaneously with the first graphical element and the
second graphical element and according to the size,
boundary, and location of the region of interest as
drawn by the second user.

11. The apparatus of claim 10, wherein the camera has a 360° field of view, wherein the information indicating the viewing direction specified by the second user is received from a server that is in communication with the computer device of the second user, and wherein the input video stream is received from the camera or the server.

12. The apparatus of claim 10, wherein to update the output video stream, the one or more processors are configured to:
determine the position for the first graphical element as a position associated with a region of the 3D space that is currently visible in the output video stream.

13. The apparatus of claim 10, wherein to update the output video stream, the one or more processors are configured to:
determine the pointing direction for the first graphical element as a pointer to a region of the 3D space that is not currently visible in the output video stream.

14. The apparatus of claim 10, wherein the one or more processors are further configured to:
update the output video stream to switch from showing the 3D space as seen from the viewing direction specified by the first user to showing the 3D space from the viewing direction specified by the second user, in response to an input applied to the second graphical element by the first user.

15. The apparatus of claim 14, wherein the one or more processors are further configured to, after updating the output video stream to show the 3D space from the viewing direction specified by the second user, cause the output video stream to be presented on the display in synchronization with presentation of an additional output video stream on a display of a third user, and wherein the additional output video stream shows the 3D space from the viewing direction specified by the second user.

16. The apparatus of claim 10, wherein the one or more processors are further configured to:
rotate the viewing direction specified by the first user based on input from the first user; and
after rotating the viewing direction specified by the first user, cause information indicating the viewing direction specified by the first user to be communicated to the computer device of the second user, wherein the information indicating the viewing direction specified by the first user is usable for updating the second output video stream being displayed to the second user, and wherein at a time that the information indicating the viewing direction specified by the first user is communicated to the computer device of the second user, the second output video stream corresponds to the 3D space as seen from the viewing direction specified by the second user.

17. The apparatus of claim 16, wherein the input from the first user comprises at least one of:
a physical rotation captured using a gyroscope in the apparatus; or
a touch input applied to the display of the apparatus.

18. A non-transitory computer-readable storage medium containing instructions that, when executed by one or more processors of a first computer device operated by a first user, cause the one or more processors to:
receive an input video stream representing a three-dimensional (3D) space, wherein the input video stream comprises images that each cover a first field of view;
generate, using the input video stream, an output video stream corresponding to the 3D space as seen from a viewing direction specified by the first user, wherein the output video stream comprises images that each cover a second field of view, the second field of view being narrower than the first field of view, the input video stream corresponding to real-time video captured by a camera located in the 3D space, and wherein the viewing direction of the first user is specified relative to a default or initial direction associated with the camera;
receive information indicating a viewing direction specified by a second user, wherein:
the second user is a user of a second computer device remote from the first computer device,
the first computer device is located in the 3D space together with the camera,
the viewing direction specified by the second user corresponds to a rotation of the viewing direction specified by the first user and is specified relative to the default or initial direction associated with the camera, and
the viewing direction specified by the second user is received as an indication of a perspective from which a second output video stream being displayed to the second user is generated, using the real-time video captured by the camera;

update the output video stream based on the information indicating the viewing direction specified by the second user, wherein the updating of the output video stream comprises:
    determining, based on the viewing direction specified by the second user, a position or pointing direction for a first graphical element that will indicate a region the second user is viewing, and
    updating the output video stream to include the first graphical element;
cause the output video stream to be presented on a display of the first user after the output video stream has been updated, wherein the output video stream is presented simultaneously with a second graphical element representing an option to switch from showing the 3D space as seen from the viewing direction specified by the first user to showing the 3D space from the viewing direction specified by the second user, the second graphical element corresponding to a window displaying video captured by a camera local to the second user;
receive information indicating a region of interest within the 3D space, wherein the information indicating the region of interest comprises a size, boundary, and location of the region of interest as drawn by the second user;
determine that the region of interest is represented in the output video stream; and
further update the output video stream to include a third graphical element indicating the region of interest, wherein the third graphical element is displayed simultaneously with the first graphical element and the second graphical element and according to the size, boundary, and location of the region of interest as drawn by the second user.

* * * * *